(12) United States Patent
Glavicic et al.

(10) Patent No.: US 10,690,634 B2
(45) Date of Patent: Jun. 23, 2020

(54) ULTRASONIC MEASUREMENT AND DETERMINATION OF CRYSTALLOGRAPHIC TEXTURE WITH RESPECT TO POSITION

(75) Inventors: Michael G. Glavicic, Indianapolis, IN (US); Jeffrey A. Gilbert, Avon, IN (US); Jason A. Gilbert, legal representative, Ione, CA (US)

(73) Assignee: Rolls-Royce Corporation, Indianapolis, IN (US)

( * ) Notice: Subject to any disclaimer, the term of this patent is extended or adjusted under 35 U.S.C. 154(b) by 1797 days.

(21) Appl. No.: 13/579,770

(22) PCT Filed: Feb. 18, 2011

(86) PCT No.: PCT/US2011/025464
§ 371 (c)(1),
(2), (4) Date: Dec. 20, 2012

(87) PCT Pub. No.: WO2011/103450
PCT Pub. Date: Aug. 25, 2011

(65) Prior Publication Data
US 2013/0253858 A1   Sep. 26, 2013

Related U.S. Application Data

(60) Provisional application No. 61/305,773, filed on Feb. 18, 2010.

(51) Int. Cl.
*G01L 7/00* (2006.01)
*G01N 11/00* (2006.01)
(Continued)

(52) U.S. Cl.
CPC ............ *G01N 29/46* (2013.01); *G01N 9/002* (2013.01); *G01N 29/0645* (2013.01); *G01N 29/07* (2013.01); *G01N 2291/0289* (2013.01)

(58) Field of Classification Search
CPC ......... G01N 9/002; G01N 29/07; G01N 29/46
(Continued)

(56) References Cited

U.S. PATENT DOCUMENTS

| 4,052,889 A | 10/1977 | Mucciardi et al. |
| 5,029,475 A * | 7/1991 | Kikuchi ................. G01N 29/11 600/449 |

(Continued)

FOREIGN PATENT DOCUMENTS

| EP | 0485960 A2 | 5/1992 |
| EP | 0763732 A2 | 3/1997 |
| GB | 2254426 A | 10/1992 |
| JP | 2005251485 A | 9/2005 |

(Continued)

OTHER PUBLICATIONS

Kundu et al., "Crystallographic texture of stress-affected bainite", Sep. 8, 2007.*

(Continued)

*Primary Examiner* — Michael P Nghiem
(74) *Attorney, Agent, or Firm* — Shumaker & Sieffert, P.A.

(57) ABSTRACT

A technique and device (12) may be utilized to determine a characteristic of a crystallographic texture of a sample (10) based on a detected ultrasonic waveform. The device may be configured to receive ultrasonic waveform data representative of a reflected ultrasonic waveform that propagated through a sample from an ultrasonic detector (14). The device may select a portion of the ultrasonic waveform data and apply a Fast Fourier Transform to the portion of the ultrasonic waveform data to transform the portion from a time domain to a frequency domain. The device then may identify a dominant frequency (98) of the portion in the frequency domain and determine a characteristic of a crystallographic texture for the portion based on the dominant frequency of the portion.

20 Claims, 12 Drawing Sheets

(51) Int. Cl.
  *G01N 31/00* (2006.01)
  *G01N 29/46* (2006.01)
  *G01N 29/07* (2006.01)
  *G01N 29/06* (2006.01)
  *G01N 9/00* (2006.01)

(58) Field of Classification Search
  USPC .............................................. 702/27, 54, 56
  See application file for complete search history.

(56) References Cited

U.S. PATENT DOCUMENTS

| | | | | |
|---|---|---|---|---|
| 5,402,681 | A * | 4/1995 | Nakaso | G01N 29/06 |
| | | | | 73/602 |
| 6,057,927 | A | 5/2000 | Levesque et al. | |
| 6,128,092 | A | 10/2000 | Levesque et al. | |
| 6,401,537 | B1 | 6/2002 | Gigliotti, Jr. et al. | |
| 2003/0130803 | A1 * | 7/2003 | Chou | G01N 23/2251 |
| | | | | 702/27 |
| 2006/0062438 | A1 * | 3/2006 | Rowe | G06K 9/00114 |
| | | | | 382/124 |
| 2007/0006651 | A1 * | 1/2007 | Kruger | G01N 29/11 |
| | | | | 73/579 |
| 2010/0148627 | A1 * | 6/2010 | Funasaka | G01H 11/08 |
| | | | | 310/316.01 |
| 2013/0039147 | A1 * | 2/2013 | Witte | A61B 5/0093 |
| | | | | 367/7 |
| 2014/0074410 | A1 * | 3/2014 | Glavicic | G01N 29/043 |
| | | | | 702/39 |

FOREIGN PATENT DOCUMENTS

| | | |
|---|---|---|
| JP | 2009097972 A | 5/2009 |
| WO | 2012112898 A1 | 8/2012 |

OTHER PUBLICATIONS

Dixon et al., "The accuracy of acoustic birefringence shear wave measurements in sheet metal," Journal of Applied Physics, vol. 104, No. 11, pp. 114901-1-114901-5, Dec. 2, 2008.
Anderson et al., "Ultrasonic Measurement of the Kearns Texture Factors in Zircaloy, Zirconium, and Titanium," Metallurgical and Materials Transactions, vol. 30, No. 8, Aug. 1, 1999, pp. 1981-1988.
Moreau et al., "On-line measurement of texture, thickness and plastic strain ratio using laser-ultrasound resonance spectroscopy," Ultrasonics, IPC Science and Technology Press Ltd., vol. 40, No. 10, pp. 1047-1056, Dec. 1, 2002.
International Search Report and Written Opinion from corresponding international application No. PCT/US2011/025464, dated May 13, 2011, 14 pp.
International Preliminary Report on Patentability from corresponding international application No. PCT/US2011/025464, dated Aug. 30, 2012, 8 pp.
Office Action from U.S. Appl. No. 14/000,054, dated Apr. 28, 2016, 21 pp.
Response to Office Action dated Apr. 28, 2016, from U.S. Appl. No. 14/000,054, filed Jul. 26, 2016, 20 pp.
Moreau et al., "On-line measurement of texture, thickness and plastic strain ratio using laser-ultrasound resonance spectroscopy," Ultrasonics, Elsevier Science B.V., Aug. 25, 1999, 10 pp.
Final Office Action from U.S. Appl. No. 14/000,054, dated Jan. 10, 2017, 20 pp.
Amendment in Response to Office Action dated Jan. 10, 2017, from U.S. Appl. No. 14/000,054 filed Mar. 9, 2017, 18 pp.
Notice of Allowance from U.S. Appl. No. 14/000,054, dated Apr. 20, 2017, 8 pp.

* cited by examiner

ULTRASONIC MEASUREMENT AND DETERMINATION OF CRYSTALLOGRAPHIC TEXTURE WITH RESPECT TO POSITION

This application claims the benefit of U.S. Provisional Application No. 61/305,773, filed Feb. 18, 2010, the entire contents of which is incorporated herein by reference.

TECHNICAL FIELD

The disclosure is directed to techniques for determining the local crystallographic texture of a polycrystalline material.

BACKGROUND

Components of high-temperature mechanical systems, such as gas-turbine engines, must operate in severe environments. Some components may be formed of a polycrystalline material, such as, for example, titanium or a titanium alloy with a hexagonal close packed (HCP) crystal structure. The grains in the polycrystalline material may each have a crystal orientation, which may be the same or different than the crystal orientation of other grains in the polycrystalline material.

Mechanical properties of a polycrystalline material may be anisotropic in a local or a macroscopic regime, with anisotropies along one or more axes of the crystal structure. For example, a polycrystalline material including an HCP crystal structure may have a main anisotropy lying along a c-axis of the HCP crystal structure. For this reason, knowledge of the orientation of crystal axes may be important when processing the polycrystalline material into a component, such as a gas turbine engine component. For example, local yield strength, dwell fatigue resistance, or the like, may be affected by the crystal orientation on a microscopic or macroscopic level.

SUMMARY

In general, the present disclosure is directed to techniques for determining a characteristic of a crystallographic texture of a polycrystalline material using ultrasonic energy. In some embodiments, the polycrystalline material may comprise a metal, an alloy, a ceramic, or the like. More particularly, disclosed herein are techniques for determining a characteristic of a crystallographic texture or crystallographic orientation for a portion of polycrystalline material with respect to position within a sample of the polycrystalline material. In some embodiments, the polycrystalline material may have a HCP crystal lattice, while in other embodiments, the polycrystalline material may have another crystal lattice, such as, for example, tetragonal or the like. In general, the techniques described in this disclosure may be broadly applicable to any polycrystalline material having any crystal lattice.

In some embodiments, an ultrasonic waveform generator (e.g., a transducer) may generate an ultrasonic waveform and transmit the waveform into a first surface of a sample of a polycrystalline material, through which the ultrasonic waveform propagates. At least a portion of the waveform may be reflected by a second surface of the sample, and may propagate along a return path through the sample to an ultrasonic waveform detector (e.g., the transducer) that senses the reflected ultrasonic waveform. The ultrasonic waveform detector measures the reflected ultrasonic waveform (e.g., amplitude and frequency) as a function of time and transmits the measured data to a data analysis device.

The data analysis device may mathematically manipulate the measured data to select a portion of the data. The portion includes a plurality of time values and associated amplitudes and/or frequencies, and may be representative of a position (e.g., depth) within the sample based on a time delay from generation of the waveform or initial sensing of the waveform to sensing of the waveform portion corresponding to the selected portion of data.

The data analysis device may apply a Fast Fourier Transform (FFT) to the selected portion of data to transform the data from the time domain to the frequency domain, and may identify a central, or dominant, frequency for the portion. The data analysis device may utilize the dominant frequency or another harmonic frequency of the waveform for the selected portion to determine a characteristic of the crystallographic texture of the sample for the portion of the sample corresponding to the selected portion of measured data. For example, the data analysis device may use the dominant or another harmonic frequency to determine an approximate micro-texture zone size by analyzing the frequency as a function of position within the sample (based on the time delay).

As another example, the data analysis device may use the dominant or another harmonic frequency to calculate the velocity of the ultrasonic waveform during the window of time using the equation $v_{id} = \lambda \Psi_d$, where $v_{id}$ is the velocity of the waveform in direction i at depth d, $\Psi_d$ is the dominant frequency or another harmonic frequency of the waveform at depth d, and $\lambda$ is the wavelength of the waveform. The data analysis device may then utilize the calculated velocity of the waveform during this portion of the measured data to calculate a crystallographic orientation value (e.g., a value representative of the c-axis orientation).

In one aspect, the disclosure is directed to system comprising a data analysis device configured to receive from an ultrasonic waveform detector ultrasonic waveform data representative of a reflected ultrasonic waveform that propagated through a sample; select a portion of the ultrasonic waveform data; apply a Fast Fourier Transform to the portion of the ultrasonic waveform data to transform the portion from a time domain to a frequency domain; identify a dominant frequency of the portion in the frequency domain; and determine a characteristic of a crystallographic texture for the portion based on the dominant frequency of the portion.

In another aspect, the disclosure is directed to a method comprising receiving from an ultrasonic waveform detector ultrasonic waveform data representative of a reflected ultrasonic waveform that propagated through a sample; selecting a portion of the ultrasonic waveform data; applying a Fast Fourier Transform to the portion of the ultrasonic waveform data to transform the portion from a time domain to a frequency domain; identifying a dominant frequency of the portion in the frequency domain; and determining a characteristic of a crystallographic texture for the portion based on the dominant frequency of the portion.

In further aspect, the disclosure is directed to a computer readable medium comprising instructions that cause a programmable processor to receive from an ultrasonic waveform detector ultrasonic waveform data representative of a reflected ultrasonic waveform that propagated through a sample; select a portion of the ultrasonic waveform data; apply a Fast Fourier Transform to the portion of the ultrasonic waveform data to transform the portion from a time domain to a frequency domain; identify a dominant frequency of the portion in the frequency domain; and determine a characteristic of a crystallographic texture for the portion based on the dominant frequency of the portion.

The details of one or more examples are set forth in the accompanying drawings and the description below. Other features, objects, and advantages will be apparent from the description and drawings, and from the claims.

BRIEF DESCRIPTION OF DRAWINGS

FIG. 12 illustrates an example of ultrasonic data collected from the polycrystalline sample shown in FIG. 11.

FIG. 15 illustrates an example of ultrasonic data collected from the same polycrystalline sample from which the EBSD data shown in FIG. 14 was collected.

DETAILED DESCRIPTION

In general, the present disclosure is directed to techniques for determining a characteristic of a crystallographic texture of a sample comprising a polycrystalline material using ultrasonic energy. More particularly, disclosed herein are techniques for determining a characteristic, such as a crystal orientation or an effective size of a micro-texture zone, of the local crystallographic texture of a polycrystalline material with respect to position within a sample of the polycrystalline material. In some embodiments, the techniques described herein may be utilized to determine a characteristic, such as a crystal orientation, of an individual grain within a polycrystalline material.

While the examples shown and described in the disclosure are directed primarily to a polycrystalline metal or alloy sample, the techniques described herein may be utilized with any polycrystalline material. For example, the techniques may be used to determine a characteristic of a local crystallographic texture of a polycrystalline ceramic material. Similarly, while the examples in the disclosure are directed primarily to polycrystalline materials having a hexagonal close packed (HCP) crystal lattice, the techniques described herein may be applied to polycrystalline materials having substantially any crystal lattice. In some embodiments, the techniques may be adapted to be used on samples having a different crystal lattice by utilizing a different equation for determining a crystallographic orientation value for a portion of the sample.

Figure 1:
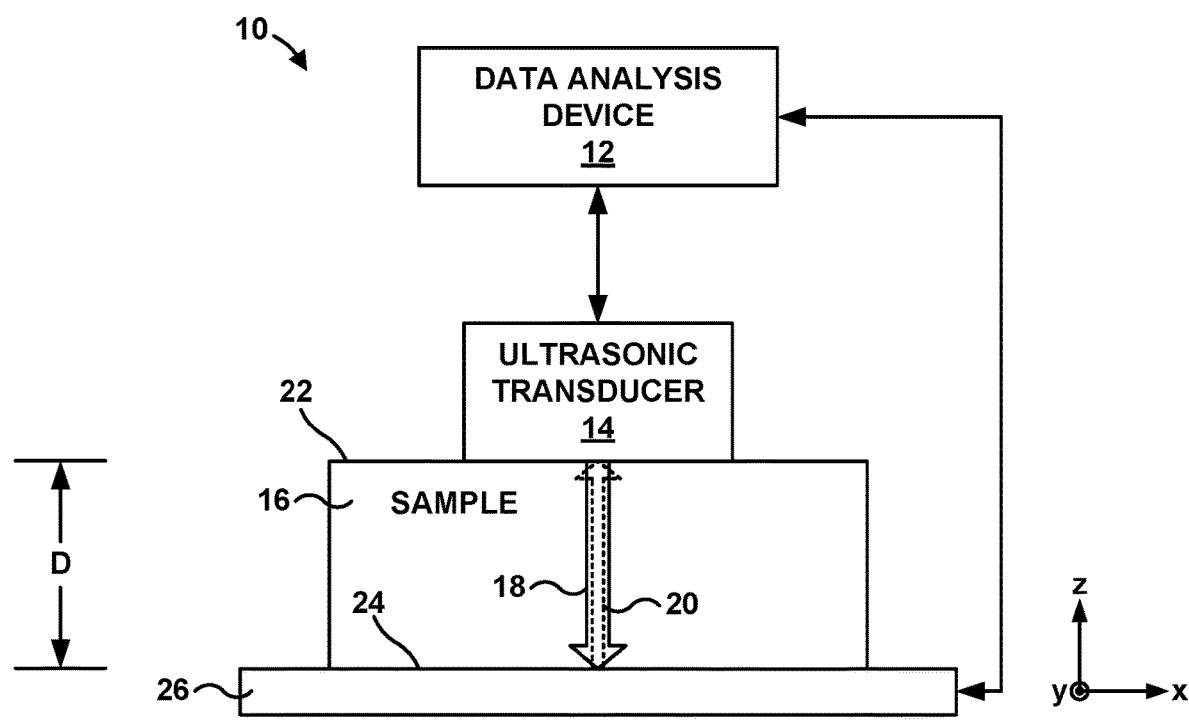
FIG. 1 is a block diagram of an example system for performing an ultrasonic crystallographic texture measurement.

FIG. 1 is a schematic diagram illustrating an example of a system 10 that may be used to determine a local crystallographic texture of a metal or alloy sample 16. System 10 includes a data analysis device 12, an ultrasonic transducer 14, and a stage 26. Sample 16 is coupled to stage 26, and ultrasonic transducer 14 is in contact with a first surface 22 of sample 16.

Sample 16 may be any polycrystalline material, including, for example, a ceramic, a metal or a metal alloy, and includes at least one grain. In some embodiments, sample 16 may include a plurality of grains (i.e., sample 16 may be polycrystalline). Each grain is formed of a single crystal, and has a crystallographic orientation, which may be the same or different than a crystallographic orientation of another grain in sample 16. For example, orientation of a hexagonal close packed (HCP) crystal lattice may be defined by the orientation of the c-axis of the HCP crystal. In some embodiments, a c-axis of at least one grain may be oriented in a different direction than a c-axis of at least one other grain. In some embodiments, sample 16 may comprise Ti or a Ti alloy, which may have an HCP crystal lattice.

Although the present disclosure is directed primarily to a sample 16 formed of Ti or a Ti alloy having an HCP crystal lattice, in other embodiments, sample 16 may be formed of another metal or alloy, a ceramic, or another polycrystalline solid. For example, sample 16 may be formed of Zr, Mg, Ni, or alloys thereof. In some embodiments, sample 16 may include a polycrystalline material that has a crystal lattice different than HCP, such as, for example, a tetragonal crystal lattice or the like. In other embodiments, sample 16 may include any other crystal lattice.

In some embodiments, certain crystal orientations may be favored or disfavored. For example, anisotropy in mechanical properties of a sample 16 formed of Ti or a Ti alloy may be determined by the direction of the c-axis within the grains of the sample 16 with respect to the applied load. Thus, determination of the orientation of c-axes of the grains in a Ti or Ti alloy sample may be important to determine how to process the Ti or Ti alloy sample 16 for use in a mechanical component. In some examples, such as a dwell fatigue sensitive alloy, both the size and crystal orientation of local micro-texture zones (i.e., zones of substantially similar grains) affect the propensity for dwell fatigue to occur.

Figure 2:
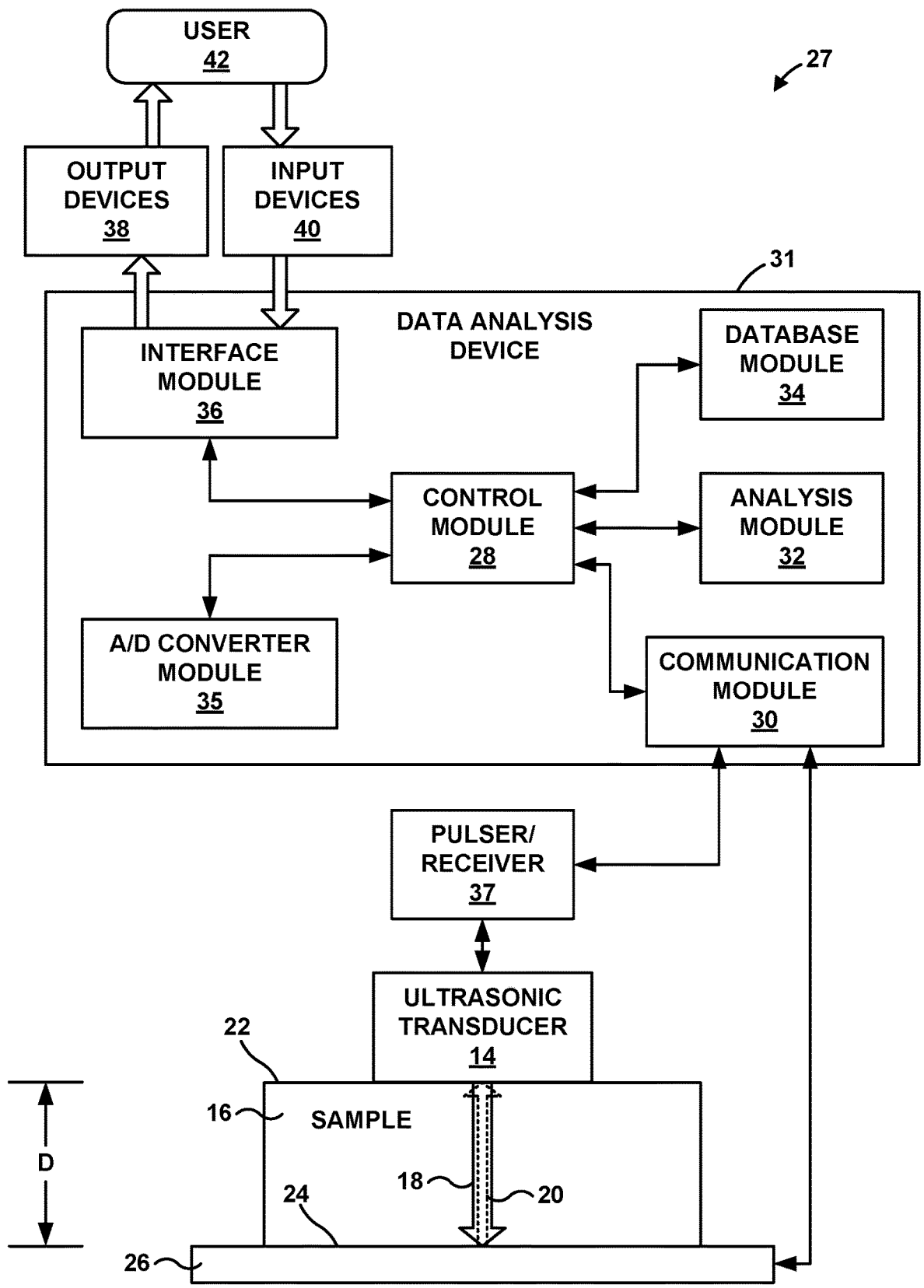
FIG. 2 is a functional block diagram illustrating an example of a system for performing an ultrasonic crystallographic texture measurement.
Figure 3:
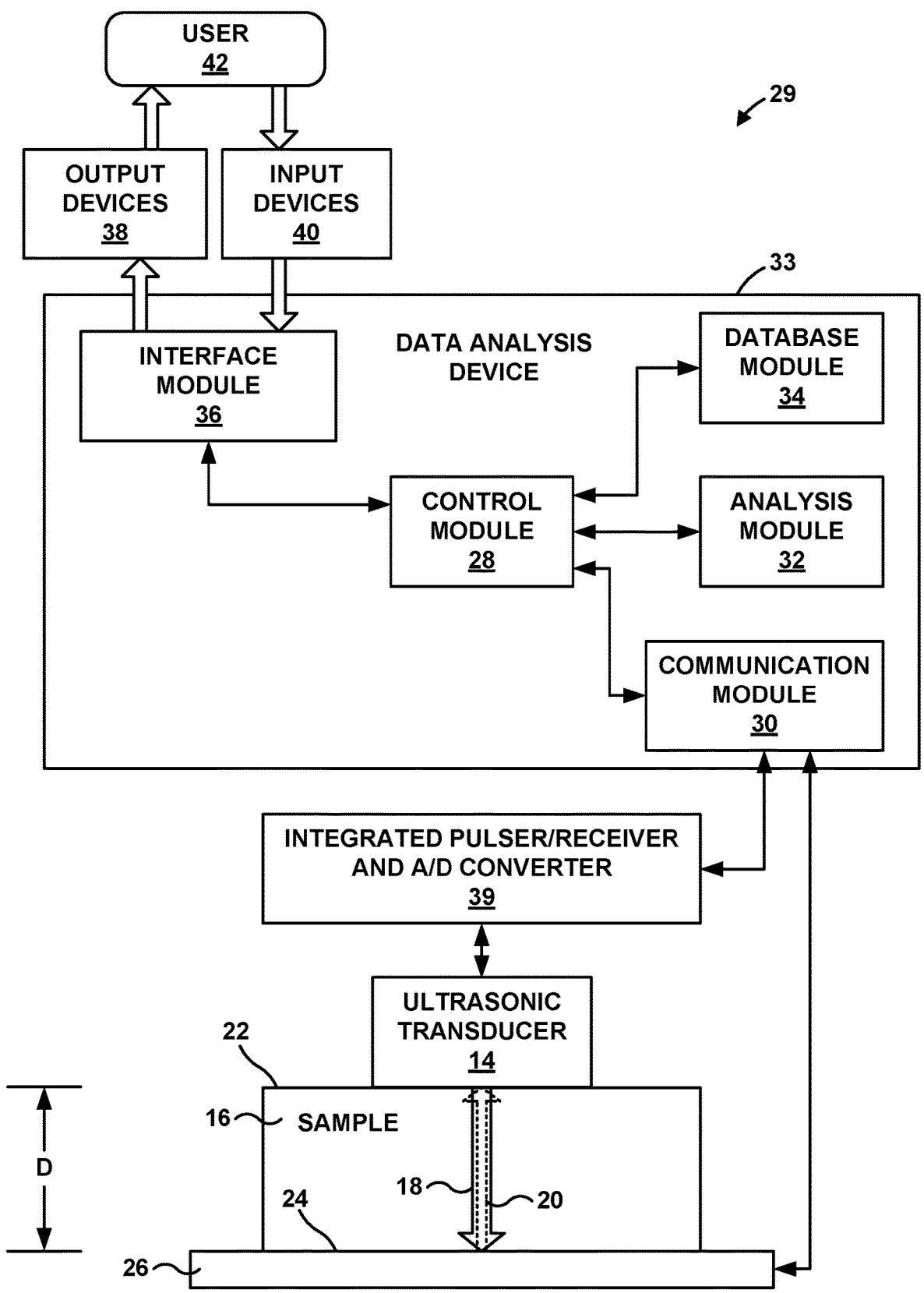
FIG. 3 is a functional block diagram illustrating an example of a system for performing an ultrasonic crystallographic texture measurement.

System 10 may be utilized to determine a characteristic of the local crystallographic texture of sample 16, including a crystallographic orientation (i.e., crystal lattice orientation) and/or an effective size of a local micro-texture zone or an individual grain. System 10 includes data analysis device 12, which controls operation of system 10 automatically or under control of a user 40 (FIGS. 2 and 3).

Data analysis device 12 may be a general-purpose workstation, desktop computer, laptop computer, a handheld computing device, a personal digital assistant (PDA), or other computing device. Data analysis device 12 may include a microprocessor, digital signal processor (DSP), field programmable gate array (FPGA), application specific integrated circuit (ASIC) or other hardware, firmware and/or software for implementing the techniques described in this disclosure. In other words, the control of system 10 and analysis of ultrasonic waveform data, as described herein, may be implemented in hardware, software, firmware, combinations thereof, or the like. If implemented in software, a computer-readable medium may store instructions, i.e., program code, that can be executed by a processor or DSP to carry out one or more of the techniques described above. For example, the computer-readable medium may comprise magnetic media, optical media, random access memory (RAM), read-only memory (ROM), non-volatile random access memory (NVRAM), electrically erasable programmable read-only memory (EEPROM), magnetoresistive random access memory (MRAM), flash memory, or other media suitable for storing program code.

Data analysis device 12 controls operation of ultrasonic transducer 14 and stage 26 and receives from ultrasonic transducer 14 signals representative of the ultrasonic waveforms detected by transducer 14. Ultrasonic transducer 14 may include both a component for generating an ultrasonic waveform (a "waveform generator") and a component for detecting an ultrasonic waveform (a "waveform detector"). In some embodiments, at least one of the waveform generator and the waveform detector comprises a piezoelectric crystal. When exposed to a voltage pulse, a piezoelectric ultrasonic waveform generator converts the voltage pulse into mechanical energy that travels through sample 16 as a longitudinal wave. Conversely, when exposed to mechanical energy in the form of the longitudinal wave, a piezoelectric ultrasonic waveform detector converts the mechanical energy of the wave into an analog voltage signal. In some embodiments, a single piezoelectric crystal may be used for both the waveform generator and the waveform detector, while in other embodiments, a first piezoelectric crystal is used as the waveform generator and a second piezoelectric crystal is used as the waveform detector. In some embodiments, another type of ultrasonic transducer may be used, such as, for example, an electromagnetic acoustic transducer (EMAT). Although not illustrated in FIG. 1, in some embodiments, system 10 may include a separate ultrasonic waveform generator and ultrasonic waveform detector instead of an integrated ultrasonic transducer 14.

Stage 26 couples to sample 16 to position and restrain sample 16 relative to ultrasonic transducer 14. In some embodiments, stage 26 may be translatable in at least one dimension.

In some embodiments, stage 26 and ultrasonic transducer 14 may operate in conjunction to position sample 16 relative to transducer 14. For example, stage 26 may be translatable in two dimensions (e.g., an x-y plane in the coordinate system shown in FIG. 1) and ultrasonic transducer 14 may be translatable in at least one dimension (e.g., the z-axis in FIG. 1). In other embodiments, each of ultrasonic transducer 14 and stage 26 may be translatable in three dimensions and may work in conjunction to position transducer 14 relative to sample 16. For example, stage 26 may provide relatively coarse positioning of sample 16, while ultrasonic transducer 14 provides relatively more precise positioning. As another example, stage 26 may provide relatively slow positioning of sample 16 relative to transducer 14, while transducer 14 provides relatively faster positioning with respect to sample 16. In some embodiments, one or both of ultrasonic transducer 14 or stage 26 may move according to another coordinate system. For example, one or both of ultrasonic transducer 14 or stage 26 may be positioned according to a polar coordinate system or a spherical coordinate system. In other words, positioning of one or both of ultrasonic transducer 14 or stage 26 may include rotational positioning and not only linear positioning.

Once ultrasonic transducer 14 is positioned relative to sample 16 such that transducer 14 contacts a first surface 22 of sample 16 either directly or via an interface fluid, a processor of data analysis device 12 may control the ultrasonic waveform generator in transducer 14 to generate an ultrasonic waveform 18. Ultrasonic transducer 14 directs at least a portion of ultrasonic waveform 18 into sample 16 through first surface 22. Ultrasonic waveform 18 may comprise a frequency between, for example, approximately 2.5 megahertz (MHz) and approximately 15 MHz, such as, for example, approximately 5 MHz. In some examples, waveform 18 may comprise a frequency greater than 15 MHz or less than 2.5 MHz. In some embodiments, the frequency of ultrasonic waveform 18 may influence the depth to which sample 16 is interrogated.

Ultrasonic waveform 18 propagates through sample 16 from first surface 22 toward second surface 24. In some embodiments, at least a portion of ultrasonic waveform 18 may be reflected by a feature within sample 16 which has a different acoustic impedance from surrounding material in sample 16. For example, ultrasonic waveform 18 may encounter a reflector, such as a crack, an inclusion, a beta fleck, a hard alpha, an ALA ("as large as;" an indication in a Ni-based superalloy) or another indication within sample 16, which reflects a portion of waveform 18.

At least a portion of ultrasonic waveform 18 propagates fully through a depth D of sample 16 and encounters second surface 24. When this occurs, at least a portion of waveform 18 reflects from second surface 24 and a reflected ultrasonic waveform 20 propagates through the depth D of sample 16 to first surface 22. At first surface 22, the waveform detector in ultrasonic transducer 14 senses reflected ultrasonic waveform 20. As described above, in some embodiments, the waveform detector is the same physical component as the waveform generator (e.g., a single piezoelectric crystal), while in other embodiments, the waveform detector may be a separate physical component from the waveform generator (e.g., the generator and detector may be separate piezoelectric crystals). The waveform detector in ultrasonic transducer 14 may sense reflected ultrasonic waveform 20 as an analog signal, in which the amplitude and/or frequency of reflected waveform 20 are measured as a function of time. For example, a piezoelectric waveform detector may generate an analog voltage signal in response to mechanical energy propagating through sample 16 as waveform 20.

The analog signal may be digitized by an analog-to-digital (A/D) converter (not shown in FIG. 1) and transmitted to data analysis device 12. The A/D converter may sample the analog signal at a predetermined sampling rate, and the sampling rate determines the time duration represented by each data bit. The sampling rate used by the A/D converter may be greater than the Nyquist rate (twice the maximum component frequency of the signal). Beyond this rate, an increased sampling rate may facilitate greater accuracy in determining the local crystallographic texture of sample 16, but results in more data, with correspondingly higher computational and data storage costs.

The A/D converter may digitize the analog signal at a specific bit depth. The bit depth defines the number of discrete values that can be used to represent the amplitude of the analog signal for a given time value. An increase bit depth results in finer distinctions between adjacent amplitude values and leads to greater fidelity of the digitized signal to the analog signal. In some embodiments, the A/D converter may be an 8-bit A/D converter, while in other embodiments, the A/D converter may be 10-bit, 12-bit, 14-bit, or 16-bit.

The digitized data is representative of the ultrasonic waveform data sensed by the waveform detector in ultrasonic transducer 14. The digitized data may comprise an array or matrix in which a first column or row stores sequential time values, a second column or row stores sequential amplitudes values associated with the respective time values, and a third column or row stores sequential frequency values associated with the respective time values. As described above, the granularity (e.g., the resolution of time values or spacing between adjacent time values) of the digitized data is a function of the sampling rate, which may be predetermined and stored in a memory of data analysis device 12, or may be input by a user.

A processor of data analysis device 12 then manipulates the digitized signal representative of reflected ultrasonic waveform 20 (hereafter "the digital signal") to extract a characteristic of a local crystallographic texture of sample 16. The processor of data analysis device 12 first selects a portion of the digital signal, which comprises a plurality of sequential time values and the associated amplitude and frequency values. The plurality of time values may be labeled $t_j$, where j runs from p to q, and (q−p+1) is the number of time values in the selected portion. Because reflected ultrasonic waveform 20 is sensed as a function of time, the sensed data at a given time corresponds to data for a certain depth from first surface 22 in sample 16. In some embodiments, the position as a function of time may be converted into an approximate physical position within sample 16 using an average velocity of reflected ultrasonic waveform 20 and a time of flight of the ultrasonic waveform 18 and reflected ultrasonic waveform 20. In this way, by selecting a portion of the digital signal corresponding to a plurality of sequential time values and processing this portion of the digital signal according to techniques described herein, a characteristic of a local crystallographic texture may be determined with respect to position within sample 16.

To determine a characteristic of the crystallographic texture, a processor of data analysis device 12 may apply a fast Fourier Transform (FFT) to the selected portion of the digital signal to transform the data from the time domain to the frequency domain. The transformed portion of the digital signal may include a central (or dominant) frequency, which the processor of data analysis device 12 may identify. In some embodiments, the processor of data analysis device 12 may also identify at least one other frequency component of the digital signal. The processor or data analysis device 12 then may utilize the dominant frequency to determine a characteristic of the local crystallographic texture within sample 16.

In one embodiment, the processor of data analysis device 12 may calculate a velocity of the ultrasonic waveform for the selected portion of the digital signal. The processor may calculate the velocity of the ultrasonic waveform from the dominant frequency selected from the FFT and the wavelength of the ultrasonic waveform according to Equation 1:

$$v_{id} = \lambda \Psi_d \quad \text{Equation 1}$$

where $v_{id}$ is the velocity of waveform 18 propagating in a direction i at a depth d, $\lambda$ is the wavelength of waveform 18, and $\Psi_d$ is the dominant frequency of the selected portion of the digital signal (i.e., $\Psi_d$ is the dominant frequency of the digital signal at depth d).

In order to calculate $v_{id}$, the processor must first determine the wavelength of waveform 18, $\lambda$. To do this, the processor first determines according to Equation 2 a parameter, L, which is the width of the selected portion.

$$L = t_q - t_p \quad \text{Equation 2}$$

where $t_q$ is the last time value in the selected portion and $t_p$ is the first time value in the selected portion. The selected portion must contain an integral number N of possible wavelengths defined by L/N, where N is any real number. The processor may determine the value of N to be used to calculate the wavelength $\lambda$ using Equation 3.

$$V_i \approx \sqrt{\frac{C_{11}^0}{\rho} - \frac{2A_1}{7\rho}\left(f_{id} - \frac{1}{3}\right)} \quad \text{Equation 3}$$

where $V_i$ is the velocity of the ultrasonic waveform in propagating direction i, $f_{id}$ is the crystallographic orientation value at depth d, which describes (in an HCP material) how many c-axes in the selected portion of the digital signal are oriented in a direction corresponding to the polarization direction of ultrasonic waveform 18, $\rho$ is the density of the metal or alloy, and $C°_{11}$ and $A_1$ are material-specific constants. For example, $C°_{11}$ may equal 162.86 and $A_1$ may equal −61.80 for Ti, while $C°_{11}$ may equal 145.18 and $A_1$ may equal −49.05 for Zr/ZIRCALOY. Other polycrystalline materials may have different $C°_{11}$ and $A_1$ constants. The processor of data analysis device 12 may utilize another equation to calculate N for a sample 16 having a different crystal lattice, e.g., a tetragonal crystal lattice.

To determine N, the processor of data analysis device 12 sets $f_{id}$ to zero to determine a minimum possible velocity, $V_{i,minimum}$, of waveform 18 in sample 16 and sets $f_{id}$ to one to determine a maximum possible velocity, $V_{i,maximum}$, of waveform 18 in sample 16. Once the processor has determined minimum and maximum velocities in sample 16, the processor iterates the value of N to determine a value of N that causes the relationship shown in Equation 4 to be satisfied.

$$V_{i,minimum} \leq \frac{L}{N}\Psi_d \leq V_{i,maximum} \quad \text{Equation 4}$$

The processor of data analysis device 12 may then use this value of N to calculate the wavelength, $\lambda = L/N$, and convert the dominant frequencies determined for each of the portions of the digital signal to velocities using Equation 1, assuming the portions have the same width L. If another portion has a different width L, the processor of data analysis device 12 must repeat the determination of N for the other portion in order to convert the dominant frequency to a velocity.

The processor of data analysis device 12 then may utilize the calculated velocity, $v_{id}$, to determine a crystallographic orientation value, $f_{id}$, for the portion of sample 16 represented by the portion of the digital signal. In one embodiment, the processor may determine the crystallographic orientation value of a polycrystalline material having a HCP crystal lattice utilizing Equation 3, where $v_{id}$ is inserted for $V_i$ and $f_d$ is then calculated.

The processor of data analysis device 12 may then output the calculated crystallographic orientation value, $f_{id}$, via a user interface of data analysis device 12 so that a user may view the crystallographic orientation value. For example, the processor may cause the user interface to display the crystallographic orientation value, $f_{id}$, in numerical format, as an entry in a table, as a point or entry in a graph or diagram, or another suitable output format.

In some embodiments, the processor of data analysis device 12 may repeat the process described above for each of a plurality of portions of the digital signal. In some examples, the respective portions of the digital signal combine to form a substantially continuous set of portions, in which one portion of the digital signal begins at a time when another portion of the digital signal ends. In other examples, the processor may select a first portion of the digital signal, which includes a first plurality of time values, may skip one or more time values, and may select a second portion of the digital signal, which includes a second plurality of time values. In this way, the processor may select at least two portions of the digital signal, while omitting at least one time value between the first portion and the second portion.

By selecting a plurality of portions of the digital signal and analyzing them according to the technique described above, the processor of data analysis device 12 may calculate a crystallographic orientation value for a plurality of portions of the digital signal. In some embodiments, the processor of data analysis device 12 may calculate crystallographic orientation values for a plurality of portions that combine to include substantially the entire depth D of sample 16 (e.g., the path of ultrasonic wave 18 and reflected ultrasonic wave 20). The processor of data analysis device 12 may cause the calculated crystallographic orientation values to be displayed or otherwise output to a user. For example, the processor of data analysis device 12 may cause the crystallographic orientation values to be displayed or otherwise output in a graph, a table, a false color map, or the like.

In some embodiments, the processor of data analysis device 12 may utilize the dominant frequency of a plurality of portions of the digital signal to determine an effective size of a micro-texture zone in sample 16. Similar to the technique described above, the processor may select a first portion of the digital signal, which represents a first plurality of time values and associated amplitude and/or frequency values. The processor may apply a FFT to the first portion of the digital signal to transform the data to a frequency domain, and identify a dominant frequency for the first portion of the digital signal. The processor may cause the dominant frequency for the first portion of the digital signal to be stored in a memory of data analysis device 12.

The processor of data analysis device 12 may then select a second portion of the digital signal and perform a substantially similar calculation, in which the processor converts the second portion from a time domain to a frequency domain through application of an FFT and selects a dominant frequency for the second portion. In some embodiments, the second portion of the digital signal may be substantially contiguous with the first portion of the digital signal, i.e., a beginning time value of the second portion may be equal to or one increment greater than an ending time value of the first portion of the digital signal. In other embodiments, the second portion of the digital signal may not be substantially contiguous with the first portion of the digital signal, i.e., there may be at least one time value between a beginning time value of the second portion and an ending time value of the first portion of the digital signal. The processor again may cause the dominant frequency for the second portion of the digital signal to be stored in a memory of data analysis device 12.

The processor of data analysis device 12 may iterate the process of selecting a portion of the digital signal, converting the portion to a frequency domain, and identifying a dominant frequency for the portion a plurality of repetitions. In some embodiments, the number of iterations may be input by a user to data analysis device 12, while in other embodiments, the number of iterations may be stored in a memory of data analysis device 12.

Once the processor of data analysis device 12 has iterated the calculation of the dominant frequency the requested number of times, the processor may cause the results of the process to be output to a user via an output device. For example, as described below with respect to FIG. 10, the processor may cause the output device to plot the dominant frequency as a function of position, measured in microseconds. In other embodiments, the processor may cause the output device to display the dominant frequency with respect to the portion of the digital signal in tabular form, in another type of plot (e.g., C-scan, B-scan, or the like), or the like.

Figure 12:
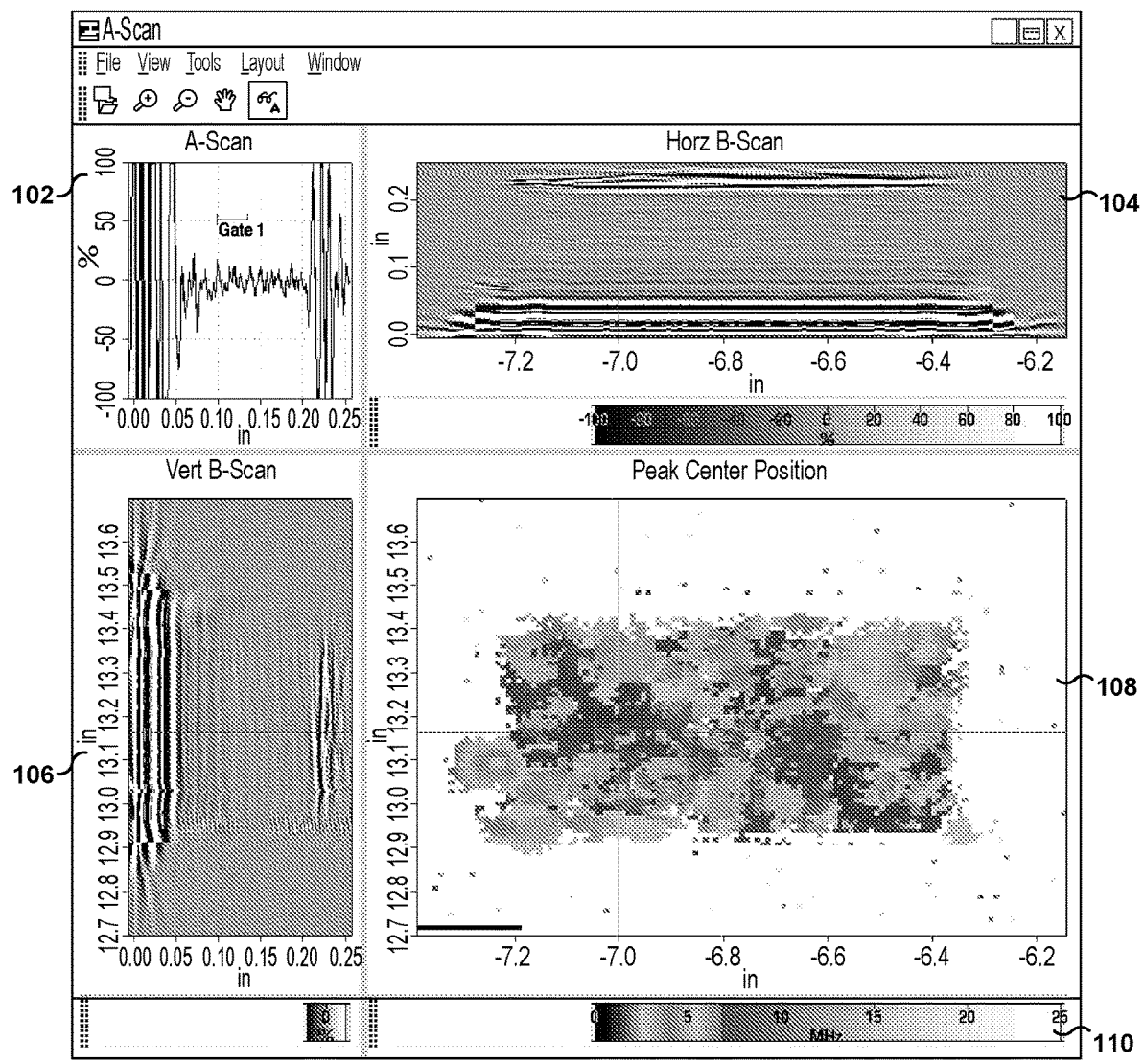
FIG. 12 is an example of a user interface screen from a computer implemented application for analyzing ultrasonic data.
Figure 13:
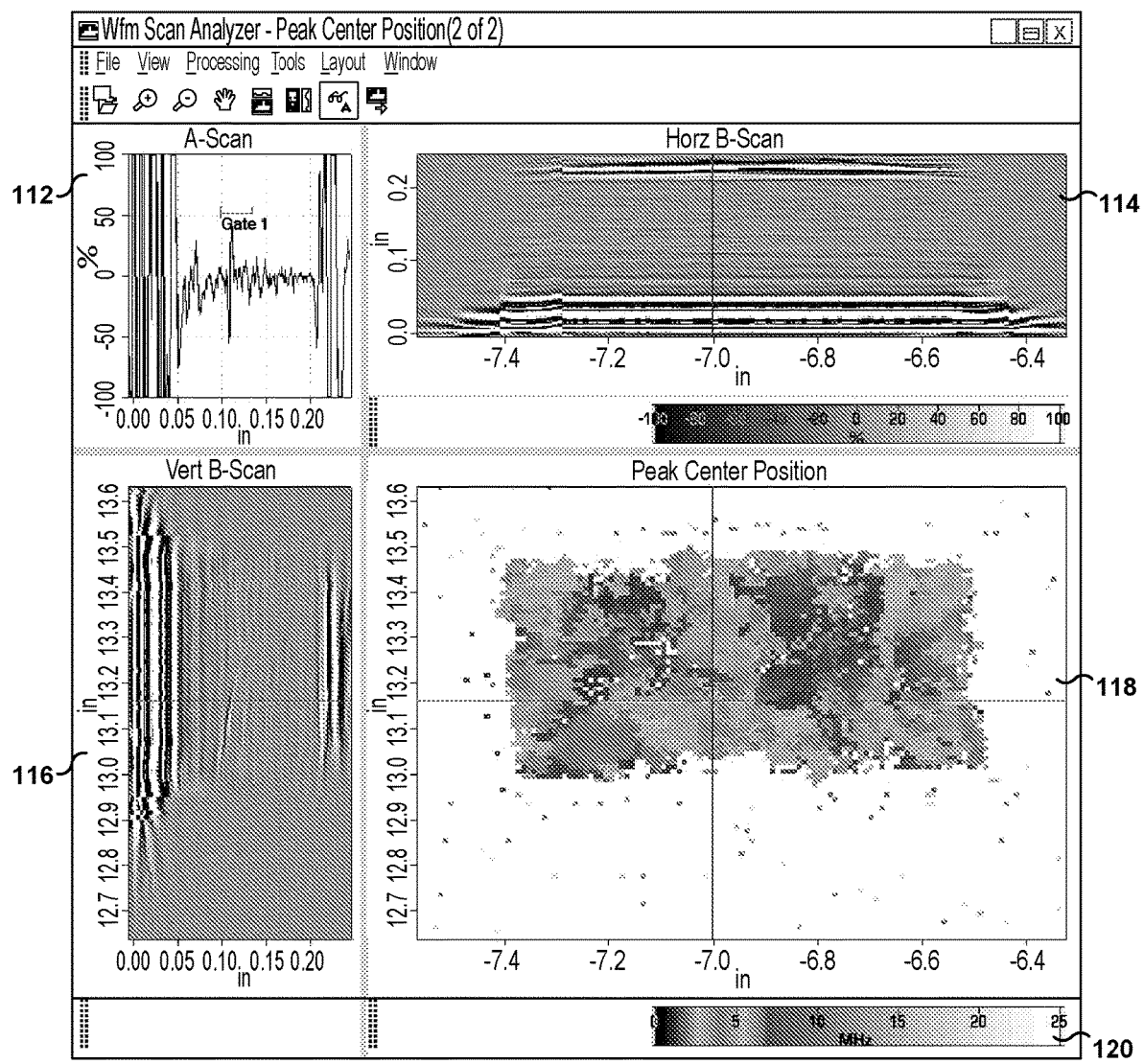
FIG. 13 is another example of a user interface screen from a computer implemented application for analyzing ultrasonic data collected from the polycrystalline sample shown in FIG. 11.
Figure 15:
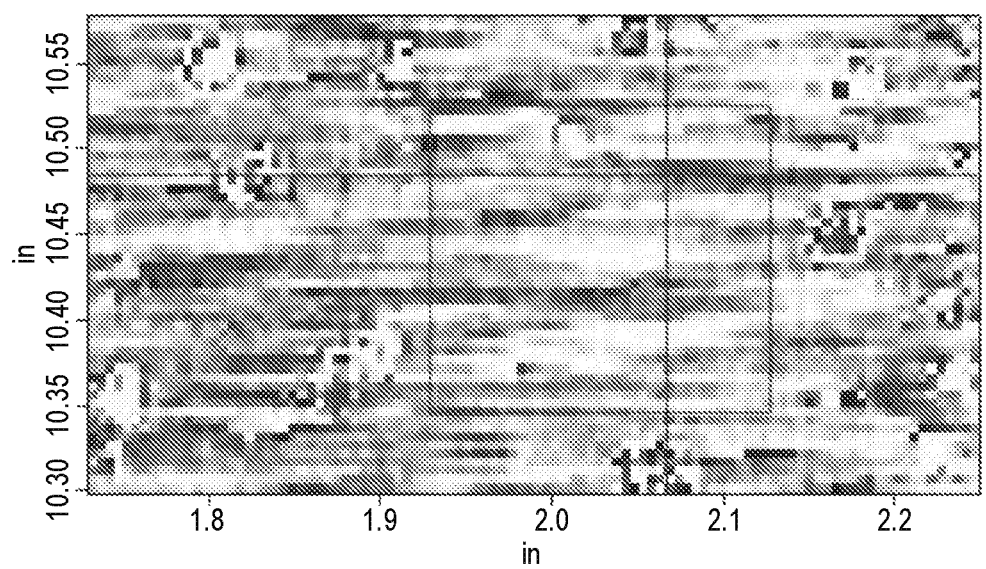
FIG. 15 is an example of a user interface screen from a computer implemented application for analyzing ultrasonic data.

The identified dominant frequencies may be used to determine an effective micro-textural zone size. Examples of this are shown in FIGS. 12, 13, and 15, below. The determination of the effective micro-textural zone size may be performed automatically by the processor of data analysis device 12, or may be performed by a user based on the outputted dominant frequency information. For example, a user may determine an effective micro-textural zone size from the outputted dominant frequency information by determining a time period over which the dominant frequency is substantially constant. This time period is the effective micro-textural zone size. The processor of data analysis device 12 may determine the effective micro-textural zone size by, for example, determining a percent change or fractional change between adjacent pairs of dominant frequencies. The processor may compare the calculated percent change or fractional change to a threshold percent change or threshold fractional change. When the calculated percent change or fractional change is less than the threshold value, the processor may determine that the adjacent pairs of dominant frequencies have the same crystallographic texture. However, when the calculated percent change or fractional change is more than the threshold value, the processor may determine that the adjacent pairs of dominant frequencies have a different crystallographic texture. The processor then may determine the effective micro-textural zone size by summing the time periods of all adjacent pairs of dominant frequencies having the same crystallographic texture. The sum of the time periods is the effective micro-textural zone size.

Additionally, in some embodiments, the processor of data analysis device 12 may perform one or more of the described techniques at a plurality of locations on upper surface 22 and/or another surface of sample 16. The processor may then utilize the sensed data for each of the plurality of locations to generate a multi-dimensional (e.g., two- or three-dimensional) representation of one or more characteristics of the crystallographic texture of sample 16. One such technique will be described below with respect to FIG. 6, although other techniques described herein may be adapted to be performed at a plurality of locations on upper surface 22 or another surface of sample 16.

In some embodiments, the processor of data analysis device 12 may utilize the $v_{id}$, the velocity of waveform 18 propagating in a direction i at a depth d, to determine the temperature of sample 16 at depth d, i.e., the temperature of the sample 16 at the selected portion.

FIG. 2 is a functional block diagram of an example of a system 27, which may be used to perform an ultrasonic crystallographic texture measurement. In the embodiment illustrated in FIG. 2, system 27 includes ultrasonic transducer 14 and a data analysis device 31. Data analysis device 31 includes a control module 28, a communication module 30, an analysis module 32, a database module 34, an A/D converter module 35, and an interface module 36. System 27 also includes a pulser/receiver 37 connected between ultrasonic transducer 14 and communication module 30.

Interface module 36 represents software and hardware necessary for interacting with a user, e.g., for receiving input from a user 42 and for outputting information to the user 42. Interface module 36 may receive input from input devices 40 and output data to output devices 38 that enable a user 42 to interact with data analysis device 12. For example, via interface module 36, user 42 may change operational parameters of data analysis device 12 and manipulate data stored in database module 34. Moreover, user 42 may interact with interface module 36 to initiate ultrasonic crystallographic texture measurement of sample 16. Further, user 42 may interact with data analysis device 12 to view and manipulate the acquired data via output devices 38 and input devices 40. During this process, interface module 36 may present a user 42 with user interface screens for interacting with analysis device 12, including, for example, the exemplary user interface screens shown in FIGS. 7-10. Exemplary input devices 40 include a keyboard, a touch screen, a mouse, a microphone, and the like. Output devices 38 may include, for example, an LCD screen, an LED array, a CRT screen, or a touch screen display.

Communication module 30 represents hardware and software necessary for communication between data analysis device 12 and another device, such as, for example, pulser/receiver 37, stage 26, or a device external to system 27, such as another computing device. The communication module 30 may include a single method or combination of methods to transfer data to and from data analysis device 12. Some methods may include a universal serial bus (USB) port, a PCI bus, or IEEE 1394 port for hardwire connectivity with high data transfer rates. In some embodiments, a storage device may be directly attached to one of these ports for data storage for post processing. The data may be pre-processed by control module 28 and/or analysis module 32 and ready for viewing, or the raw data may need to be completely processed before analyzing can begin.

Communication module 30 may also may include radio frequency (RF) communication or a local area network (LAN) connection. Moreover, communication may be achieved by direct connection or through a network access point, such as a hub or router, which may support wired or wireless communications.

Control module 28 represents control logic that, in response to input received from user 42 via interface module 36, directs the operation of data analysis device 12 and pulser/receiver 37. For example, control module 28 may comprise software instructions that, when executed, provide control logic for communicating commands to pulser/receiver 37 to commence ultrasonic crystallographic texture measurement and data collection via ultrasonic transducer 14. Furthermore, control module 28 provides control logic for storing the collected crystallographic texture data within database module 34, and for invoking analysis module 32 to process the data automatically or in response to commands from user 42.

In response to a command from a user 42, control module 28 may instruct via communication module 30 at least one of stage 26 (FIG. 1) and ultrasonic transducer 14 (FIG. 1) to position sample 16 relative to transducer 14. As described above, at least one of stage 26 and ultrasonic transducer 14 may be translatable in at least one dimension. In some embodiments, control module 28 may cause stage 26 and ultrasonic transducer 14 to operate in conjunction to position sample 16 relative to transducer 14.

Once control module 28 has caused ultrasonic transducer 14 to be positioned relative to sample 16 such that transducer 14 contacts a first surface 22 of sample 16 either directly or via an interface fluid, control module 28 may control pulser/receiver 37 to generate an electrical pulse or waveform that is transmitted to the waveform generator in ultrasonic transducer 14 to generate an ultrasonic waveform 18. Ultrasonic transducer 14 directs at least a portion of ultrasonic waveform 18 into sample 16 through first surface 22, and ultrasonic waveform 18 may propagate through sample 16 is a direction substantially normal to first surface 22. Ultrasonic waveform 18 may comprise any suitable frequency, such as, for example, frequency between approximately 2.5 megahertz (MHz) and approximately 15 MHz. In some embodiments, waveform 18 may comprise a frequency of approximately 5 MHz. In some embodiments, the frequency of ultrasonic waveform 18 may influence the depth to which sample 16 is interrogated.

In some embodiments, a frequency and amplitude of ultrasonic waveform 18 may be stored in database module 34. Database module 34 represents hardware and software necessary for storing and retrieving data, and may comprise, for example, a suitable magnetic media, optical media, random access memory (RAM), read-only memory (ROM), non-volatile random access memory (NVRAM), electrically erasable programmable read-only memory (EEPROM), flash memory, or other media suitable for storing program code and data. In other embodiments, the frequency and, optionally, amplitude of ultrasonic waveform 18 may be input by user 42 via input devices 40.

Once generated by ultrasonic transducer 14 under control of pulser/receiver 37, ultrasonic waveform 18 propagates through sample 16 from first surface 22 toward second surface 24. In some embodiments, at least a portion of ultrasonic waveform 18 may be reflected internally within sample 16. For example, ultrasonic waveform 18 may encounter a reflector, such as a crack, beta fleck, hard alpha, inclusion, or other indication within sample 16, which reflects a portion of waveform 18.

At least a portion of ultrasonic waveform 18 propagates fully through a depth D of sample 16 and encounters second surface 24. When this occurs, at least a portion of waveform 18 reflects from second surface 24 and a reflected ultrasonic waveform 20 propagates through the depth D of sample 16 to first surface 22. At first surface 22, ultrasonic detector in ultrasonic transducer 14 senses reflected ultrasonic waveform 20. The waveform detector in ultrasonic transducer 14 may sense reflected ultrasonic waveform 20 as an analog signal (e.g., a piezoelectric detector generates an analog voltage in response to mechanical energy propagating through sample 16 as waveform 20), in which the amplitude and frequency of reflected waveform 20 is detected as a function of time. In other words, the data representative of reflected waveform 20 may be collected and/or stored as a function of time delay from first sensing reflected waveform 20.

In the embodiment illustrated in FIG. 2, pulser/receiver 37 receives the analog signal from ultrasonic transducer 14 and communicates the analog signal to control module 28 via communication module 30. Control module 28 causes A/D converter module 35 to digitize the analog signal. As described above with respect to FIG. 1, the digital signal is representative of ultrasonic waveform data sensed by the waveform detector in ultrasonic transducer 14. The digital signal may comprise an array or matrix in which a first column or row stores sequential time values, a second column or row stores sequential amplitudes values associated with the respective time values, and a third column or row stores sequential frequency values associated with the respective time values. The granularity (e.g., the resolution of time values or spacing between adjacent time values) of the digital signal may be predetermined and stored in a memory of data analysis device 12, or may be input by a user. The granularity is controlled by the sampling rate at which A/D converter module 35 samples the analog signal when converting the analog signal to a digital signal. The sampling rate may be equal to or greater than the Nyquist rate. The precise sampling rate used may be selected based on considerations of the accuracy desired and data storage or processing limitations. In some embodiments, the sampling rate may be significantly higher than the Nyquist rate, such as, for example 1 gigahertz (GHz).

Similarly, the A/D converter module 35 may operate at a specific bit depth, which refers to the number of bits used to represent the amplitude of signal at a given time value. A greater bit depth may result in greater fidelity between the digital signal and the analog signal produced by ultrasonic transducer 14. However, a greater bit depth may also result in greater data processing and storage requirements. In some example, the bit depth at which A/D converter module 35 operates may be, for example, 8 bits, 10 bits, 12 bits, 14 bits, or 16 bits.

In some embodiments, control module 28 causes the digital signal to be stored in database module 34 for later manipulation or may communicate the digital signal to analysis module 32 for analysis according to one or more techniques described herein.

Analysis module 32 receives the digital signal from control module 28, processes the data according to at least one of the techniques described herein, and determines at least one characteristic of a local crystallographic texture based on the processed data. For example, analysis module 32 may select a first portion of the digital signal comprising a plurality of time values and associated amplitude and/or frequency values. Analysis module 32 may then apply an FFT to the first portion of the digital signal to transform the digital signal from a time domain to a frequency domain.

Analysis module 32 then may identify a center (or dominant) frequency of the first portion of the digital signal. Analysis module 32 utilizes the dominant frequency to determine at least one characteristic of a local crystallographic texture within sample 16.

For example, analysis module 32 may utilize the dominant frequency of the first portion to calculate a velocity of the ultrasonic waveform for the first portion of the digital signal according to Equations 1-4, above. As described above, analysis module 32 first determines the wavelength, $\Psi_d$, of reflected waveform 20 for the first portion of the digital signal. To do this, analysis module 32 may determine a parameter, L, using Equation 2. L represents a time width of the selected portion. L contains an integral number N of possible wavelengths defined by L/N, where N is any real number.

Analysis module 32 determines N utilizing Equations 3 and 4.

Analysis module 32 may then utilize the calculated velocity, $v_{id}$, to determine the crystallographic orientation within the first portion (e.g., orientation of c-axes within the first portion) according to Equation 3, above.

Control module 28 may cause the determined crystallographic orientation, e.g., the crystallographic orientation value, $f_{id}$, to be outputted via interface module 36 and output devices 38 for viewing by user 42. For example, control module 28 may cause interface module 36 to display the crystallographic orientation value on output devices 38 in numerical format, as an entry in a table, as a point or entry in a graph or diagram, or another suitable output format.

In some embodiments, analysis module 32 may repeat the process described above for each of a plurality of portions of the digital signal. In some examples, the respective portions of the digital signal combine to form a substantially continuous set of portions, in which one portion of the digital signal begins at a time when another portion of the digital signal ends. In other examples, analysis module 32 may select a first portion of the digital signal, which includes a first plurality of time values, may omit one or more time values, and may select a second portion of the digital signal, which includes a second plurality of time values. In this way, analysis module 32 may select at least two portions of the digital signal, while not selecting one or more time value between the first portion and the second portion.

By selecting a plurality of portions of the digital signal and analyzing them according to the technique described above, analysis module 32 may calculate crystallographic orientation values, $f_{id}$, representative of crystallographic orientation for a plurality of portions of the digital signal. In some embodiments, analysis module 32 may calculate crystallographic orientation values for a plurality of portions that combine to include substantially the entire depth D of sample 16 (e.g., the path of ultrasonic wave 18 and reflected ultrasonic wave 20). Control module 28 may cause the determined crystallographic orientation values to be outputted via interface module 36 and output devices 38 for viewing by user 42. For example, control module 28 may cause interface module 36 to display the crystallographic orientation values on output devices 38 in numerical format, as an entry in a table, as a point or entry in a graph or diagram, or another suitable output format.

In some embodiments, analysis module 32 may utilize the dominant frequency of a plurality of portions of the digital signal to determine an effective size of a micro-texture zone in sample 16. Similar to the process described above, analysis module 32 may select a first portion of the digital signal. Analysis module 32 may apply a FFT to the first portion of the digital signal to transform the data to a frequency domain, and identify a dominant frequency for the first portion of the sensed data. Analysis module 32 may cause the dominant frequency for the first portion of the sensed data to be stored in a memory of data analysis device 12, along with a representative time value for the first portion, e.g., a mean time value for the portion, a median time value for the portion, or the like.

Analysis module 32 may repeat this process for subsequent portions of the digital signal and perform a substantially similar calculation, in which analysis module 32 converts the portion to a frequency domain through application of an FFT and selects a dominant frequency for the portion. In some embodiments, the portions of the digital signal may be substantially contiguous with each other, i.e., a beginning time value of one portion may be equal to or one increment greater than an ending time value of another portion of the digital signal. In other embodiments, the portions of the digital signal may not be substantially contiguous, i.e., there may be at least one time value between a beginning time value of one portion and an ending time value of another portion of sensed data. Analysis module 32 again may cause the dominant frequency for each portion of the digital signal to be stored in a database module 34, along with an associated time value for each portion of the digital signal.

Once analysis module 32 has iterated the calculation of the dominant frequency the requested number of times, control module 28 may cause the results of the process to be outputted to a user 42 via an output devices 38. For example, as described below with respect to FIG. 10, control module 28 may cause output devices 38 to plot the dominant frequency as a function of position, e.g., time value, measured in microseconds. In other embodiments, control module 28 may cause output devices 38 to display the dominant frequency with respect to the portion of the digital signal in tabular form, as another type of plot (e.g., bar, line, or the like), or the like.

In some embodiments, analysis module 32 may automatically determine an effective micro-textural zone size based on the dominant frequencies of the respective portions of the digital signal. For example, analysis module 32 may determine the effective micro-textural zone size by, for example, determining a percent change or fractional change between adjacent pairs of dominant frequencies. Analysis module 32 may compare the calculated percent change or fractional change to a threshold percent change or threshold fractional change. When the calculated percent change or fractional change is less than the threshold value, analysis module 32 may determine that the adjacent pairs of dominant frequencies have the same crystallographic texture. However, when the calculated percent change or fractional change is more than the threshold value, analysis module 32 may determine that the adjacent pairs of dominant frequencies have a different crystallographic texture. Analysis module 32 then may determine the effective micro-textural zone size by summing the time periods of all adjacent pairs of dominant frequencies having the same crystallographic texture. The sum of the time periods is the effective micro-textural zone size.

Additionally, in some embodiments, control module 28 may perform one or more of the described techniques at a plurality of locations on upper surface 22 and/or another surface of sample 16. Control module 28 may then utilize the sensed data for each of the plurality of locations to generate a multi-dimensional, e.g., two-dimensional or three dimensional, representation of at least one characteristic of the crystallographic texture of sample 16. One such technique will be described below with respect to FIG. 6, although other techniques described herein may be adapted to be performed at a plurality of locations on upper surface 22 or another surface of sample 16.

FIG. 3 illustrates a functional block diagram of another example of a system 29 that may be used to perform an ultrasonic crystallographic texture measurement on a sample 16. System 29 is similar to system 27 described with reference to FIG. 2. However, in contrast to system 27 illustrated in FIG. 2, data analysis device 33 of system 29 does not include an A/D converter module 35. Instead, system 29 includes an integrated pulser/receiver and A/D converter 39 connected between communication module 30 of data analysis device 33 ultrasonic transducer 14.

Modules having similar reference numerals in FIGS. 2 and 3 may perform similar functions and may comprise similar hardware, firmware, software, or combinations thereof. For example, interface module 36 represents software and hardware for interacting with a user. Communication module 30, database module 34 and analysis module 32 may also function as described with respect to FIG. 2.

Similar to the functions with respect to system 27 of FIG. 2, control module 28 may control integrated pulser/receiver and A/D converter 39 to generate an electrical pulse or waveform that is transmitted to the waveform generator in ultrasonic transducer 14 to generate an ultrasonic waveform 18. Ultrasonic transducer 14 directs at least a portion of ultrasonic waveform 18 into sample 16 through first surface 22, and ultrasonic waveform 18 may propagate through sample 16 is a direction substantially normal to first surface 22. Ultrasonic waveform 18 may comprise any suitable frequency, such as, for example, frequency between approximately 2.5 megahertz (MHz) and approximately 15 MHz. In some embodiments, waveform 18 may comprise a frequency of approximately 5 MHz. In some embodiments, the frequency of ultrasonic waveform 18 may influence the depth to which sample 16 is interrogated.

Once generated by ultrasonic transducer 14 under control of integrated pulser/receiver and A/D converter 39, ultrasonic waveform 18 propagates through sample 16 from first surface 22 toward second surface 24. In some embodiments, at least a portion of ultrasonic waveform 18 may be reflected internally within sample 16. For example, ultrasonic waveform 18 may encounter a reflector, such as a crack, beta fleck, hard alpha, inclusion, or other indication within sample 16, which reflects a portion of waveform 18.

At least a portion of ultrasonic waveform 18 propagates fully through a depth D of sample 16 and encounters second surface 24. When this occurs, at least a portion of waveform 18 reflects from second surface 24 and a reflected ultrasonic waveform 20 propagates through the depth D of sample 16 to first surface 22. At first surface 22, ultrasonic detector in ultrasonic transducer 14 senses reflected ultrasonic waveform 20. The waveform detector in ultrasonic transducer 14 may sense reflected ultrasonic waveform 20 as an analog signal (e.g., a piezoelectric detector generates an analog voltage in response to mechanical energy propagating through sample 16 as waveform 20), in which the amplitude and frequency of reflected waveform 20 is detected as a function of time. In other words, the data representative of reflected waveform 20 may be collected and/or stored as a function of time delay from first sensing reflected waveform 20.

In the embodiment illustrated in FIG. 3, integrated pulser/receiver and A/D converter 39 receives the analog signal from ultrasonic transducer 14 and the A/D converter converts the analog signal to a digital signal before communicating the digital signal to control module 28 via communication module 30. Control module 28 then may cause analysis module 32 to perform one or more of the techniques described herein on the digital signal or may cause the digital signal to be stored in database module 34 for later manipulation and analysis.

As described above with respect to FIGS. 1 and 2, the digital signal is representative of ultrasonic waveform data sensed by the waveform detector in ultrasonic transducer 14. The digital signal may comprise an array or matrix in which a first column or row stores sequential time values, a second column or row stores sequential amplitudes values associated with the respective time values, and a third column or row stores sequential frequency values associated with the respective time values. The granularity (e.g., the resolution of time values or spacing between adjacent time values) of the digital signal may be predetermined and stored in a memory of data analysis device 12, or may be input by a user. The granularity is controlled by the sampling rate at which the A/D converter in integrated pulser/receiver and A/D converter 39 samples the analog signal when converting the analog signal to a digital signal. The sampling rate may be equal to or greater than the Nyquist rate. The precise sampling rate used may be selected based on considerations of the accuracy desired and data storage or processing limitations. In some embodiments, the sampling rate may be significantly higher than the Nyquist rate, such as, for example 1 gigahertz (GHz).

Similarly, integrated pulser/receiver and A/D converter 39 may operate at a specific bit depth, which refers to the number of bits used to represent the amplitude of signal at a given time value. A greater bit depth may result in greater fidelity between the digital signal and the analog signal produced by ultrasonic transducer 14. However, a greater bit depth may also result in greater data processing and storage requirements. In some example, the bit depth at which integrated pulser/receiver and A/D converter 39 operates may be, for example, 8 bits, 10 bits, 12 bits, 14 bits, or 16 bits.

In some embodiments, control module 28 causes the digital signal to be stored in database module 34 for later manipulation or may communicate the digital signal to analysis module 32 for analysis according to one or more techniques described herein.

Figure 4:
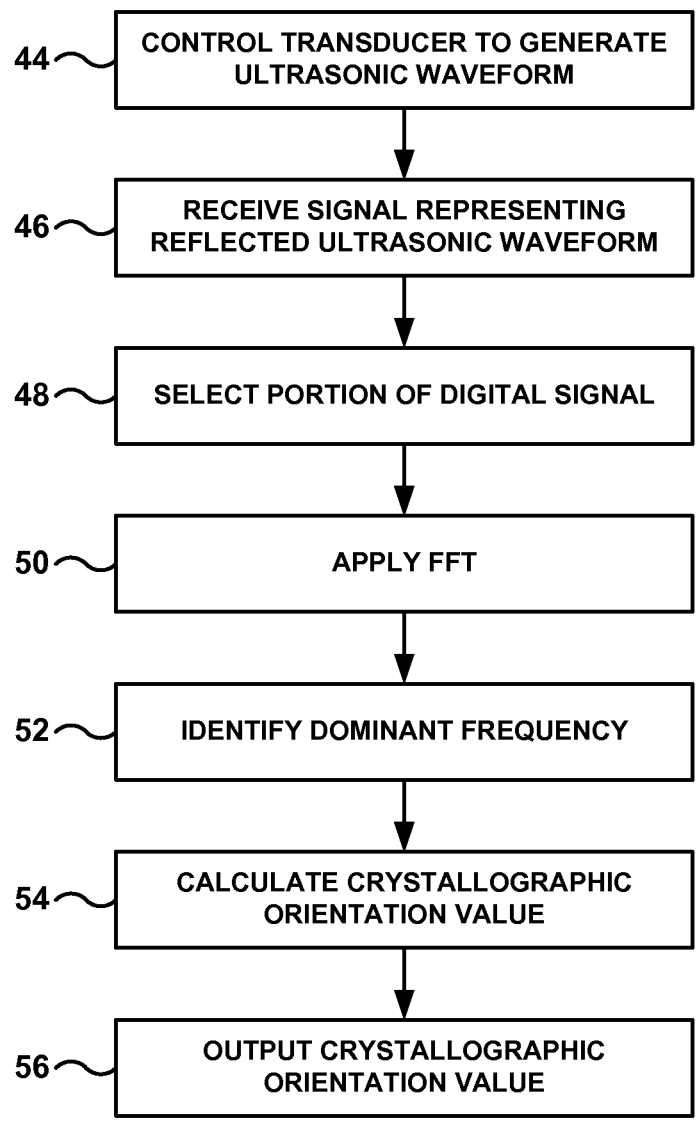
FIG. 4 is a flow diagram of an example technique for performing an ultrasonic crystallographic texture measurement.

FIG. 4 is a flow diagram of an example of a technique which data analysis device 33 (or data analysis device 12 or 31) may perform to determine a characteristic of a local crystallographic texture of a sample, in particular, a crystallographic orientation of a portion of the sample. FIG. 4 will be described with concurrent reference to FIG. 3, although other systems, such as system 27 illustrated in FIG. 2 or system 10 illustrated in FIG. 1, may be adapted to perform the technique illustrated in FIG. 4.

Initially, control module 28 causes integrated pulser/receiver and A/D converter 39 to generate a pulse or waveform that causes a waveform generator in ultrasonic transducer 14 to generate an ultrasonic waveform 18 (44). As described above, ultrasonic transducer 14 transmits ultrasonic waveform 18 into upper surface 22, either through direct contact, or through an interface fluid, which may be utilized to ensure sufficient acoustic coupling between transducer 14 and upper surface 22.

Control module 28 may cause the ultrasonic generator to generate ultrasonic waveform 18 with substantially any frequency. In some embodiments, the frequency may be between approximately 2.5 MHz and 15 MHz. For example, the ultrasonic generator may generate ultrasonic waveform 18 with a frequency of approximately 5 MHz. The frequency of ultrasonic waveform 18 may influence the depth to which sample 16 is interrogated.

Ultrasonic waveform 18 propagates through sample 16 from first surface 22 toward second surface 24. In some embodiments, at least a portion of ultrasonic waveform 18 may be reflected internally within sample 16. For example, ultrasonic waveform 18 may encounter a reflector, such as a crack, inclusion, beta fleck, hard alpha, or other indication within sample 16, which reflects a portion of waveform 18.

At least a portion of ultrasonic waveform 18 propagates fully through a depth D of sample 16 and encounters second surface 24. When this occurs, at least a portion of waveform 18 reflects from second surface 24 and a reflected ultrasonic waveform 20 propagates through the depth D of sample 16 to first surface 22. At first surface 22, an ultrasonic waveform detector in ultrasonic transducer 14 detects reflected ultrasonic waveform 20. For example, as described above, the ultrasonic detector may comprise a piezoelectric crystal that generates a voltage when subjected to vibration, such as vibrations from reflected waveform 20. The ultrasonic waveform detector in ultrasonic transducer 14 may sense reflected ultrasonic waveform 20 as an analog signal, in which the amplitude and frequency of reflected waveform 20 is sensed as a function of time. The reflected waveform 20 may be sensed as a function of time delay from first sensing reflected waveform 20.

Integrated pulser/receiver and A/D converter 39 converts the analog signal representative of the sensed reflected ultrasonic waveform 20 into a digital signal, which is then transmitted to control module 28 of data analysis device 33 via communication module 30. In other embodiments, as illustrated in FIG. 2, pulser/receiver 37 may transmit the analog signal via communication module 30 to A/D converter 35, which then may digitize the analog signal. In either case, control module 28 receives a signal representative of reflected ultrasonic waveform 20 (46).

The digital signal may comprise an array or matrix in which time values are stored in a first column or row. Corresponding amplitudes and frequencies are stored in additional columns or rows, respectively. Stated another way, the digital signal comprises a dataset $D(t_j, A_j, f_j)$, where $t_j$ are time values, $A_j$ are amplitude values, and $f$ are frequency values. Subscript j runs from 0 to n, where n is the number of time values for the complete dataset.

Control module 28 may transmit the digital signal to analysis module 32 to manipulate the digital signal and determine a characteristic of a local crystallographic texture of sample 16. Analysis module 32 may first select a portion of the digital signal (48) by selecting a subset of time values and associated amplitude values and frequency values. For example, analysis module 32 may select a plurality of time values $t_j$, where j=p, p+1, p+2, . . . , q−2, q−1, q; and p and q are integers, each less than or equal to n. Time values $t_p$ and $t_q$ represent the initial and final times, respectively, for the selected portion. Analogously, $t_p$ and $t_q$ represent, respectively, the initial and final depths within sample 16 for the selected portion. Analysis module 32 also selects the corresponding amplitudes, $A_j$, and frequencies, $f_j$, where j=p, p+1, p+2, . . . , q−2, q−1, q; and p and q are integers, each less than or equal to N. The number of time values (q−p+1) the analysis module 32 selects for the portion of the digital signal may depend on, for example, the desired resolution of the portion, e.g., the size of the portion, the time between adjacent time values, or the like. An increased number of time values in a selected portion of the digital signal may lead to reduced computation time, as fewer portions may be required to span the depth D of sample 16. However, an increased number of time values in a selected portion of the digital signal may also decrease the resolution of the portions, and may obscure features having a size less than the distance represented by the difference between the first time value (p) and the last time value (q) in the selected portion. In some embodiments, the number of time values in a portion may be selected to be representative of a length less than an expected grain size of sample 16, to increase the probability that the selected portion provides information for a single grain in sample 16 instead of a collection of grains.

Once analysis module 32 has selected a portion of the digital signal, analysis module applies a Fast Fourier Transform (FFT) to the selected portion to convert the portion from the time domain to the frequency domain (50). When transformed into the frequency domain, the selected portion may include a central, or dominant, frequency (see, e.g., FIG. 9). Analysis module 32 may automatically identify the dominant frequency (52), or may output the digital signal transformed into the frequency domain, enabling a user 42 to manually identify the dominant frequency (52).

Analysis module 32 may then utilize the identified dominant frequency of the portion to calculate a crystallographic orientation of the portion (54). Analysis module 32 first utilizes the dominant frequency of the portion, $\Psi_d$, and Equations 1-4 to calculate a velocity, $v_{id}$, of the waveform 18 for the position within sample 16 corresponding to the selected portion of the digital signal. As described above, the subscript i indicates the propagation direction of the ultrasonic waveform 18 and the subscript d indicates the selected portion (or the depth).

To determine the velocity, analysis module 32 first may determine the wavelength of the waveform 18 for the selected portion of the digital signal. Analysis module 32 first determines according to Equation 2 a width of the selected portion, L. As described above, analysis module 32 then determines a value of a real number N, such that L/N is the wavelength of the waveform 18 for the selected portion. To determine N, analysis module utilizes Equation 3, first setting $f_{id}$ to zero to determine a minimum possible velocity, $V_{i,minimum}$, of waveform 18 in sample 16 and then setting $f_{id}$ to one to determine a maximum possible velocity, $V_{i,maximum}$, of waveform 18 in sample 16. Once analysis module 32 has determined minimum and maximum velocities in sample 16, the processor iterates the value of N to determine a value of N that causes the product $(L/N)\Psi_d$ to fall between $V_{i,minimum}$ and $V_{i,maximum}$. Analysis module 32 may then use this value of N to calculate the wavelength, $\lambda=L/N$, and convert the dominant frequency for the selected portion of the digital signal to a velocity using Equation 1. Analysis module 32 may utilize the same wavelength value L/N for all other portions of the digital signal having the same width L. If another portion has a different width L, analysis module 32 must repeat the determination of N and L/N for each portion having a different width L in order to convert the dominant frequency to a velocity.

Analysis module 32 then utilizes the calculated velocity, $v_{id}$, to determine a crystallographic orientation for the portion of sample 16 represented by the portion of the digital signal (54). In particular, analysis module 32 may determine the crystallographic orientation utilizing Equation 3, above. As described above, the calculated crystallographic orientation value, $f_{id}$, describes how many c-axes in the position within sample 16 corresponding to the selected portion of the digital signal are oriented in a direction corresponding to the polarization direction of ultrasonic waveform 18. Equation 3 may be applicable for a polycrystalline material having an HCP crystal lattice. Materials with other crystal lattices may have different equations by which crystallographic orientation may be determined.

Finally and optionally, control module 28 may receive the calculated crystallographic orientation value, $f_{id}$, and cause the crystallographic orientation value to be output via output devices 38 for viewing by a user 42 (56). For example, control module 28 may cause output devices 38 to display the crystallographic orientation value in numerical format, as an entry in a table, as a point or entry in a graph or diagram, or another suitable output format.

Although not illustrated in FIG. 4, the technique illustrated in FIG. 4 may be repeated by data analysis device 12 for each of a plurality of portions of the digital signal. For example, in some embodiments, analysis module 32 may select a second portion of the digital signal including a plurality of $t_j$ values and corresponding $A_j$ and $f_j$ values, in which j=q+1, q+2, . . . , q+(r−1), m+r, where m and p are integers and m+p is less than or equal to N. In such an example, the first portion, where j=p, p+1, p+2, . . . , q−2, q−1, q; and the second portion, where j=q+1, q+2, . . . , q+(r−1), q+r; are substantially contiguous with each other, and represent positions within sample 16 that are directly adjacent each other.

In other embodiments, analysis module 32 may select a second portion of the digital signal that is not substantially contiguous with the first portion of the digital signal, e.g., a plurality of $t_j$ values in which j=q+10, q+11, . . . , q+(r−1), q+r. In such an example, a time (e.g., position/depth) gap exists between the first portion and the second portion.

In either example, analysis module 32 may iterate the technique illustrated in FIG. 4 for each of a plurality of portions of the digital signal. Analysis module 32 may select a portion of the digital signal (48), apply an FFT to the portion to convert the portion from the time domain to the frequency domain (50), identify a dominant frequency of the portion (52), and calculate a crystallographic orientation for the portion based on the dominant frequency (54). The plurality of portions may combine to provide crystallographic orientation information along a path traversed by ultrasonic waveform 18 and reflected ultrasonic waveform 20. A resolution of the crystallographic orientation information along the path may be influenced by, for example, the time width of each of the portions, the spacing of the portions, or the like. For example, a smaller time width (e.g., fewer time measurement points) for each individual portion may result in finer resolution of the crystallographic orientation information along the path. Conversely, a greater time width (e.g., more time measurement points) for each individual portion may result in finer resolution of the crystallographic orientation information along the path.

Control module 28 may receive the plurality of calculated crystallographic orientation values, $f_{id}$, and cause the crystallographic orientation values to be output via output devices 38 for viewing by a user 42 (56). For example, control module 28 may cause output devices 38 to display the crystallographic orientation values in numerical format, as an entry in a table, as a point or entry in a graph or diagram, or another suitable output format.

Figure 5:
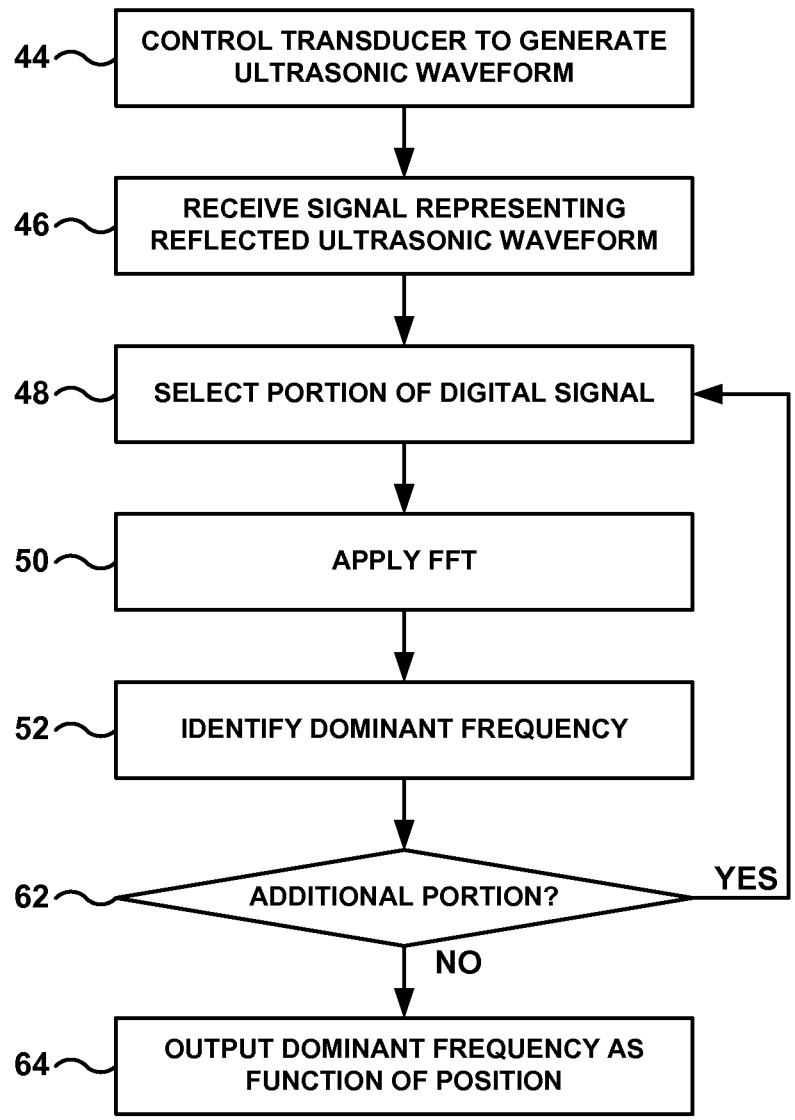
FIG. 5 is a flow diagram of another example technique for performing an ultrasonic crystallographic texture measurement.

FIG. 5 illustrates another example of a technique that data analysis device 33 (or data analysis device 12 or 31) may perform to determine a characteristic of a crystallographic texture for a portion of sample 16. In particular, the technique illustrated in FIG. 5 may be utilized to determine an approximate width of a local micro-texture zone within sample 16. FIG. 5 will be described with concurrent reference to FIG. 3, although other systems, such as system 27 illustrated in FIG. 2 or system 10 illustrated in FIG. 1, may be adapted to perform the technique illustrated in FIG. 5.

Initially, the technique proceeds similarly to the technique described with reference to FIG. 4. Control module 28 causes integrated pulser/receiver and A/D converter 39 to generate a pulse or waveform that causes a waveform generator in ultrasonic transducer 14 to generate an ultrasonic waveform 18 and transmit the waveform 18 into first surface 22 of sample 16 (44). At least a portion of ultrasonic waveform 18 propagates through sample 16 to second surface 24, where at least a portion of waveform 18 is reflected and propagates back through sample 16 as reflected waveform 20. When reflected waveform 20 reaches first surface 22, a waveform detector in ultrasonic transducer 14 detects reflected waveform 20 as a function of time. The waveform detector in transducer 14 detects reflected waveform 20 as an analog signal. Integrated pulser/receiver and A/D converter 39 converts the analog signal representative of the sensed reflected ultrasonic waveform 20 into a digital signal, which is then transmitted to control module 28 of data analysis device 33 via communication module 30. In other embodiments, as illustrated in FIG. 2, pulser/receiver 37 may transmit the analog signal via communication module 30 to A/D converter 35, which then may digitize the analog signal.

In either case, control module 28 receives a digital signal representing reflected ultrasonic waveform 20 (46). Control module 28 then transfers the digital signal to analysis module 32. Analysis module 32 selects a portion of the digital signal (48) and applies an FFT to the digital signal (50) to transform the digital signal from the time domain to the frequency domain. Analysis module 32 then identifies the center, or dominant, frequency for the selected portion of the digital signal (52). In some embodiments, analysis module 32 may communicate the dominant frequency and associated portion to control module 28, which then communicates the dominant frequency and associated portion to database module 34 for storage.

Analysis module 32 then determines if an additional portion is to be selected and a dominant frequency determined for the additional portion (62). In some embodiments, the number of iterations, or portions of the digital signal to be selected, may be stored in database module 34. In other embodiments, the number of portions of the digital signal to be selected and analyzed by analysis module 34 may be input by user 42 via input devices 40. In either case, analysis module 32 may determine that an additional portion of the digital signal is to be selected an analyzed, and may select a second portion of the digital signal (48).

In some embodiments, the second portion of the digital signal may comprise a plurality of time values and associated amplitude and frequency values, where a first time value of the second portion is adjacent to a last time value of the first portion of the digital signal. In mathematical notation, the first portion of the digital signal may comprise a plurality of time values, $t_j$, where $j=p, p+1, p+2, \ldots, q-2, q-1, q$, and p and q are integers. The second portion of the digital signal then may comprise a plurality of time values, $t_j$, where $j=q+1, q+2, \ldots, q+(r-1), q+r$, where q and r are integers.

In other embodiments, analysis module 32 may select a second portion of the digital signal (48) that is not substantially contiguous with the first portion of the digital signal, e.g., the second portion may comprise a plurality of $t_j$ values in which $j=q+10, q+11, \ldots, q+(r-1), q+r$. In such an example, a time gap exists between the first portion and the second portion. Such an approach may speed analysis of the digital signal by analysis module 32 by reducing a number of calculations performed by analysis module 32, but may omit from the analysis a portion of the digital signal, which may reduce resolution or accuracy of the technique.

As described above, resolution of the technique may depend on a number of time values selected for each portion of the digital signal. A smaller number of time values in a selected portion of the signal may lead to increased resolution, and a greater probability that small features, such as individual grains within sample 16 will be represented by a portion of the digital signal. Because of this, in some embodiments, the number of time values (e.g., q–p or r–q) in a portion may be selected to be representative of a length less than an expected grain size of sample 16, to increase the probability that the selected portion provides information for a single grain in sample 16 instead of a collection of grains.

Once analysis module 32 has selected the second portion of the digital signal (48), analysis module 32 may apply an FFT to the second portion to transform the data from a time domain to a frequency domain (50). Analysis module 32 then identifies a center, or dominant, frequency from the transformed data for the second portion (52). Again, analysis module 32 may communicate the dominant frequency and associated portion to control module 28, which then communicates the dominant frequency and associated portion to database module 34 for storage.

Figure 10:
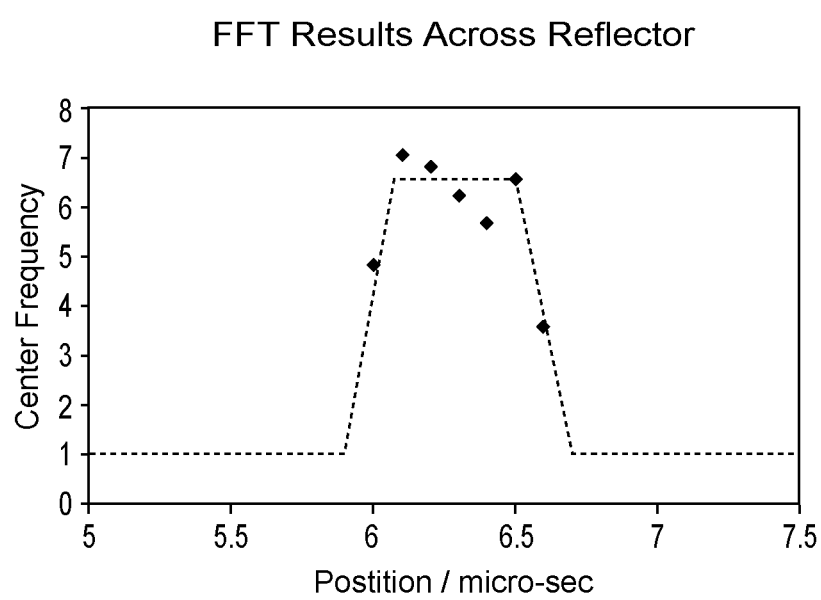
FIG. 10 is an example of a diagram of center or dominant frequency plotted as a function of position within a sample.

Analysis module 32 iterates this process of determining whether there are additional portions of the digital signal to be selected and analyzed (62) and analyzing the portion until module 32 determines that there are no remaining additional portions of the signal to be selected and analyzed (62). Once the analysis of the digital signal is completed by analysis module 32, control module 28 may cause interface module 36 to output via output devices 38 the dominant frequencies for each of the portions as a function of position within sample 16 (64). The position may be represented by a mean time value for each respective portion, a median time value for each respective portion, a first time value for each respective portion, a last time value for each respective portion, or the like. The control module 32 may cause interface module 36 to output the dominant frequencies for the respective portions as a table, line graph, scatter plot, bar graph, or the like. One example of a scatter plot of dominant frequency versus position is illustrated in FIG. 10.

Figure 6:
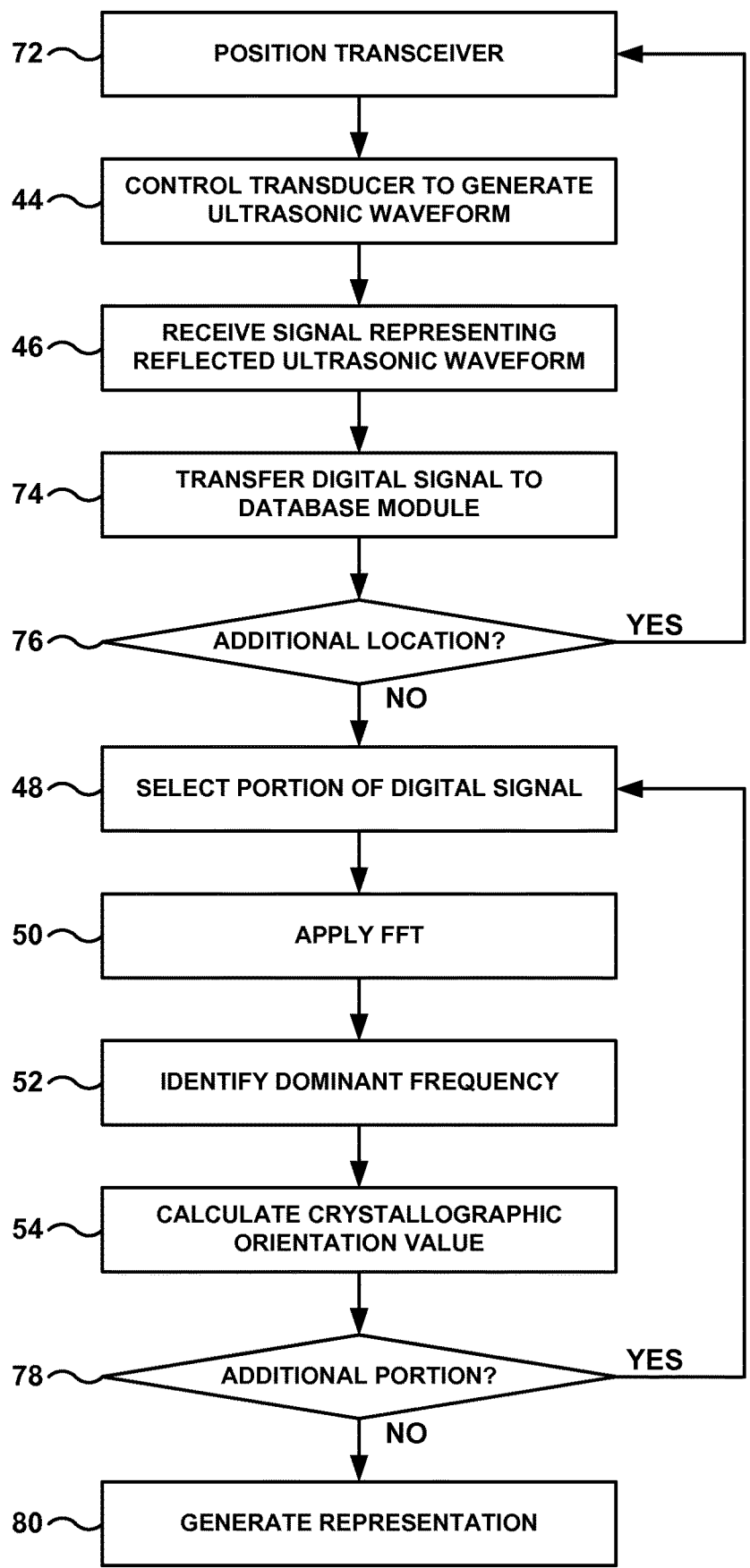
FIG. 6 is a flow diagram of another example technique for performing an ultrasonic crystallographic texture measurement.

As described briefly above, in some embodiments, control module 28 may cause ultrasonic waveform measurements to be performed at a plurality of positions along first surface 22 and/or another surface of sample 16. FIG. 6 illustrates one example of such a technique. FIG. 6 will be described with concurrent reference to system 29 of FIG. 3, although other systems, such as system 27 illustrated in FIG. 2 or system 10 illustrated in FIG. 1, may be adapted to perform the technique illustrated in FIG. 6.

Initially, control module 28 controls at least one of ultrasonic transducer 14 and stage 26 to position transducer 14 at a position on upper surface 22 (72). In some embodiments, stage 26 may be translatable in at least one dimension, and control module 28 may control stage 26 alone to position transducer 14 at a position on upper surface 22. In other embodiments, stage 26 may be substantially fixed in position and control module 28 may control the position of ultrasonic transducer 14 to position transducer 14 at a position on upper surface 22.

In some embodiments, control module 28 may control both stage 26 and ultrasonic transducer 14 in conjunction to position sample 16 relative to transducer 14. For example, stage 26 may be translatable in at least two dimensions (e.g., an x-y plane in the coordinate system shown in FIG. 1) and ultrasonic transducer 14 may be translatable in at least one dimension (e.g., the z-axis in FIG. 1). In other embodiments, each of ultrasonic transducer 14 and stage 26 may be translatable in three dimensions and control module 28 may control transducer 14 and stage 26 in conjunction to position transducer 14 relative to sample 16. For example, stage 26 may provide relatively coarse positioning of sample 16, while ultrasonic transducer 14 provides relatively more precise positioning. As another example, stage 26 may provide relatively slow positioning of sample 16 relative to transducer 14, while transducer 14 provides relatively faster positioning with respect to sample 16. In some embodiments, control module 28 may control one or both of ultrasonic transducer 14 or stage 26 to move according to another coordinate system. For example, control module 28 may control one or both of ultrasonic transducer 14 or stage 26 to be positioned according to a polar coordinate system or a spherical coordinate system. In other words, positioning of one or both of ultrasonic transducer 14 or stage 26 by control module 28 may include rotational positioning and not only linear positioning.

In some embodiments, a geometry of sample 16 (e.g., the geometry of first surface 22, second surface 24, and other surfaces of sample 16) may be collected by data analysis device 12 or programmed into data analysis device 12 by user 42. For example, a geometry of sample 16 may be represented by a numerical model, which may be stored in database module 34 or programmed by user 42 into data analysis device 12. The numerical model may describe a shape of surfaces of sample 16, and may also define a position of sample 16 relative to, for example, stage 26. Control module 28 may utilize the numerical model to position ultrasonic transducer 14 relative to first surface 22 or another surface of sample 16. Additionally and optionally, control module 28 may cause the position of ultrasonic transducer 14 relative to sample 16 and/or the orientation of transducer 14 relative to sample 16 to be stored in database module 34 and associated with the digital signal collected at this position. Such association of the position and/or orientation of transducer 14 with the digital signal may be used by control module 28 at a later time to construct a model of a characteristic of a crystallographic texture of sample 16 as a function of position within sample 16.

In some examples, instead of utilizing a single ultrasonic transducer 14, system 29 may include a plurality of ultrasonic transducers 14 which control module 28 controls to substantially simultaneously scan sample 16 at a corresponding plurality of locations. The location of each of the plurality of ultrasonic transducers 14 may be registered to the position of sample 16, and control module 28 may be configured to convolve the data received from two or more of the transducers 14 into a multidimensional data display format, or may allow a user to view data from each of the transducers 14 independently.

Once ultrasonic transducer 14 is positioned at a position on upper surface 22 or another surface of sample 16, control module 28 then controls integrated pulser/receiver and A/D converter 39 to generate a pulse or waveform that causes the waveform generator in ultrasonic transducer 14 to generate an ultrasonic waveform 18 and transmit the waveform 18 into first surface 22 of sample 16 (44). At least a portion of ultrasonic waveform 18 propagates through sample 16 to second surface 24, where at least a portion of waveform 18 is reflected and propagates back through sample 16 as reflected waveform 20. When reflected waveform 20 reaches first surface 22, the waveform detector in ultrasonic transducer 14 detects reflected waveform 20 as a function of time delay, either from generation of waveform 18 or from initial sensing of reflected waveform 20. The waveform detector in transducer 14 detects reflected waveform 20 as an analog signal. Integrated pulser/receiver and A/D converter 39 may convert the analog signal representative of the sensed reflected ultrasonic waveform 20 into a digital signal, which is then transmitted to control module 28 of data analysis device 33 via communication module 30. In other embodiments, as illustrated in FIG. 2, pulser/receiver 37 may transmit the analog signal via communication module 30 to A/D converter 35, which then may digitize the analog signal. The digital signal may be stored in a data array or matrix with columns or rows of time, amplitude, and frequency, as described above.

In either case, control module 28 receives a digital signal representing reflected ultrasonic waveform 20 (46). In some embodiments, control module 28 then may transfer the digital signal to analysis module 32 for analysis, which will be described below. For purposes of the embodiment shown in FIG. 6, control module 28 may transfer the digital signal to database module 34 (74) to store for later analysis by analysis module 32.

Once the control module 28 has transferred the collected digital signal to database module 34 for storage, control module 28 may determine whether an additional location of sample 16 is to be scanned (76). An additional location may be scanned for a variety of reasons. For example, a plurality of additional locations may be scanned in order to assemble a multi-dimensional (e.g., two-dimensional or three dimensional) representation of a crystallographic texture characteristic of sample 16. As another example, a user may desire information regarding a crystallographic texture characteristic at two or more separate locations of sample 16.

When control module 28 determines that ultrasonic transducer 14 is to be moved to a different location relative to sample 16, control module 28 may position transducer 14 at the new location (72). As described above, in some embodiments, the geometry of sample 16 (e.g., the geometry of first surface 22, second surface 24, and other surfaces of sample 16) may be collected by data analysis device 12 or programmed into data analysis device 12 by user 42. For example, a geometry of sample 16 may be represented by a numerical model, which may be stored in database module 34 or programmed by user 42 into data analysis device 12. The numerical model may describe a shape of surfaces of sample 16, and may also define a position of sample 16 relative to, for example, stage 26. Control module 28 may utilize the numerical model to position ultrasonic transducer 14 relative to first surface 22 or another surface of sample 16 at the new location. Additionally and optionally, control module 28 may cause the position of ultrasonic transducer 14 relative to sample 16 and/or the orientation of transducer 14 relative to sample 16 to be stored in database module 34 and associated with the digital signal collected at this position. Such association of the position and/or orientation of transducer 14 with the digital signal may be used by control module 28 at a later time to construct a model of a characteristic of a crystallographic texture of sample 16 as a function of position within sample 16.

Once control module 28 has caused ultrasonic transducer 14 to be positioned relative to sample 16 at the new position (72), control module 28 controls integrated pulser/receiver and A/D converter 39 to generate a pulse or waveform that causes a waveform generator in transducer 14 to generate an ultrasonic waveform 18 (44). The technique continues as described above, and control module 28 receives a signal representing reflected ultrasonic waveform 20 (46). Control module 28 then transfers the digital signal to database module 34 (74).

Control module 28 then determines whether ultrasonic transducer 14 is to be moved to an additional location relative to sample 16 and another ultrasonic scan performed (76). When control module 28 determines that ultrasonic transducer 14 is to be moved to an additional location, control module 28 causes transducer 14 to be positioned relative to sample 16 is a new position (72). The technique then continues as described above.

When control module 28 determines that ultrasonic transducer 14 is not to be moved to an additional location relative to sample 16 (76), control module 28 may proceed to control analysis of the collected digital signals by analysis module 32.

Under control of control module 28, analysis module 32 selects a portion of the digital signal (48) and applies an FFT to the digital signal (50) to transform the digital signal from the time domain to the frequency domain. Analysis module 32 then identifies the center, or dominant, frequency for the selected portion of the digital signal (52).

Analysis module 32 may then utilize the identified dominant frequency of the portion to calculate a crystallographic orientation of the portion (52). Analysis module 32 first utilizes the dominant frequency, $\Psi_d$, of ultrasonic waveform 18 to calculate according to Equations 1-4 a velocity, $v_{id}$, of the waveform 18 for the position within sample 16 corresponding to the selected portion of the digital signal. As described above, the subscript i indicates the propagation direction of the ultrasonic waveform 18 and the subscript d indicates the depth of the selected portion within sample 16.

Analysis module 32 then utilizes the calculated velocity, $v_{id}$, to determine a crystallographic orientation value for the portion of sample 16 represented by the portion of the digital signal (54). In particular, analysis module 32 may determine the crystallographic orientation value utilizing Equation 3, above. As described above, the calculated crystallographic orientation value, $f_{id}$, describes how many c-axes in the position within sample 16 corresponding to the selected portion of the digital signal are oriented in a direction corresponding to the propagation direction of ultrasonic waveform 18. Equation 3 may be applicable for polycrystalline materials having an HCP crystal lattice. Materials with other crystal lattices may have different equations by which crystallographic orientation value may be determined. Analysis module 32 may communicate the crystallographic orientation value, $f_{id}$, and a time value indicative of the associated portion to control module 28, which then communicates the crystallographic orientation value and associated time value to database module 34 for storage. In some embodiments, the crystallographic orientation value and associated time value may be associated in database module 34 with the position of ultrasonic transducer 14 relative to sample 16.

Analysis module 32 then determines if an additional portion is to be selected and a crystallographic orientation value determined for the additional portion (78). In some embodiments, the number of iterations, or portions of the digital signal to be selected, may be stored in database module 34. In other embodiments, the number of portions of the digital signal to be selected and analyzed by analysis module 34 may be input by user 42 via input devices 40. In either case, analysis module 32 may determine that an additional portion of the digital signal is to be selected an analyzed, and may select a second portion of the digital signal (48).

In some embodiments, the second portion of the digital signal may comprise a plurality of time values and associated amplitude and frequency values, where a first time value of the second portion is adjacent to a last time value of the first portion of the digital signal. In mathematical notation, the first portion of the digital signal may comprise a plurality of time values, $t_j$, where j=p, p+1, p+2, . . . , q−2, q−1, q, and p and q are integers. The second portion of the digital signal then may comprise a plurality of time values, $t_j$, where j=q+1, q+2, . . . , q+(r−1), q+r, where q and r are integers.

In other embodiments, analysis module 32 may select a second portion of the digital signal (48) that is not substantially contiguous with the first portion of the digital signal, e.g., the second portion may comprise a plurality of $t_j$ values in which j=q+10, q+11, . . . , q+(r−1), q+r. In such an example, a time gap exists between the first portion and the second portion. Such an approach may speed analysis of the digital signal by analysis module 32 by reducing a number of calculations performed by analysis module 32, but may omit from the analysis a portion of the digital signal, which may reduce resolution or accuracy of the technique.

As described above, resolution of the technique may depend on a number of time values selected for each portion of the digital signal. A smaller number of time values in a selected portion of the signal may lead to increased resolution, and a greater probability that small features, such as individual grains within sample 16 will be represented by a portion of the digital signal. Because of this, in some embodiments, the number of time values (e.g., q−p or r−q) in a portion may be selected to be representative of a length less than an expected grain size of sample 16, to increase the probability that the selected portion provides information for a single grain in sample 16 instead of a collection of grains.

Once analysis module 32 has selected the second portion of the digital signal (48), analysis module 32 may apply an FFT to the second portion to transform the data from a time domain to a frequency domain (50). Analysis module 32 then identifies a center, or dominant, frequency from the transformed data for the second portion (52) and utilizes the dominant frequency to determine a crystallographic orientation value, $f_{id}$ (54). Again, analysis module 32 may communicate the crystallographic orientation value and time value indicative of the associated portion to control module 28, which then communicates the crystallographic orientation value and associated time value to database module 34 for storage.

Analysis module 32 iterates this process of determining whether there are additional portions of the digital signal to be selected and analyzed (78) and analyzing the portion until module 32 determines that there are no remaining additional portions of the signal to be selected and analyzed (78). Analysis module 32 may perform this iterative technique for the digital signal collected at each location on the surface of sample 16.

Once the analysis of the digital signals is completed by analysis module 32, control module 28 then may proceed to generate and output a representation of at least some of the calculated crystallographic orientation values (78). In some embodiments, control module 28 may cause interface module 34 to output via output devices 38 a user interface screen that allows user 42 to select a format in which control module 28 causes interface module 34 to output the calculated crystallographic orientation values. Exemplary formats in which the crystallographic orientation values may be viewed include a table, a graph, a two- or three-dimensional false color map, or the like. A false color map may utilize different colors as representing different values for a characteristic. For example, a color of each location within the output data may represent a crystallographic orientation for that location and different colors or shades of a color may be used to represent different crystallographic orientations.

Additionally or alternatively, control module 28 may cause interface module 34 to output via output devices 38 a user interface screen that allows user 42 to select a sub-set of the calculated crystallographic orientation values to be displayed via output devices 38. For example, the user interface screen may allow user 42 to select a single portion or a plurality of portions of data (i.e., a single location within or a plurality of locations within sample 16) for which user 42 wishes to view the crystallographic orientation value(s). As other examples, the user interface screen may allow user 42 to select a line within sample 16 corresponding to portions of the data for which user 42 wishes to view the crystallographic orientation values, a plane within sample 16 corresponding to portions of the data for which user 42 wishes to view the crystallographic orientation values, or a three-dimensional portion of sample 16 (which may include substantially all sample 16) corresponding to portions of the data for which user 42 wishes to view the crystallographic orientation values.

Control module 28 may generate and output the crystallographic orientation values for the indicated portions of data utilizing the mapping of the position of ultrasonic transducer 14 relative to sample 16. For example, as described above, the a numerical model of the geometry of sample 16 may be programmed into data analysis device 12, stored in database module 34, and used by control module 28 to position ultrasonic transducer 14 relative to sample 16. Control module 28 may then use this numerical model of the geometry of sample 16 in combination with a numerical representation of the position and orientation of transducer 14 to determine the propagation path of ultrasonic waveform 18 and reflected ultrasonic waveform 20 through sample 16. When analysis module 32 determines the crystallographic orientation value for a portion of a digital signal, analysis module 32 or control module 28 may relate the position of the portion and the crystallographic orientation value for this portion to a position within sample 16 utilizing the numerical model of the geometry of sample 16, the propagation path of ultrasonic waveform 18 and reflected ultrasonic waveform 20, and the position of the portion along the propagation path. By repeating this process for each portion of a waveform 18 and at each location on sample 16 at which an ultrasonic measurement was performed by system 10, control module 28 or analysis module 32 may construct a multi-dimensional array of the position of the respective portions and the associated crystallographic orientations values within sample 16. Control module 28 may utilize this multi-dimensional array of the portions and associated crystallographic orientations to generate and output via interface module 34 the crystallographic orientations requested by user 42 (78).

The techniques described in this disclosure, including those attributed to data analysis device 12, or various constituent components, may be implemented, at least in part, in hardware, software, firmware or any combination thereof. For example, various aspects of the techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components, embodied a general purpose or purpose-built computing device. The term "processor" or "processing circuitry" may generally refer to any of the foregoing logic circuitry, alone or in combination with other logic circuitry, or any other equivalent circuitry.

Such hardware, software, firmware, or combinations thereof may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware and/or software components, or integrated within common or separate hardware or software components.

When implemented in software, the functionality ascribed to the systems, devices and techniques described in this disclosure may be embodied as instructions on a computer-readable medium such as random access memory (RAM), read-only memory (ROM), non-volatile random access memory (NVRAM), electrically erasable programmable read-only memory (EEPROM), magnetoresistive random access memory (MRAM), FLASH memory, magnetic data storage media, optical data storage media, or the like. The instructions may be executed to support one or more aspects of the functionality described in this disclosure.

EXAMPLES

Example 1

Figure 7:
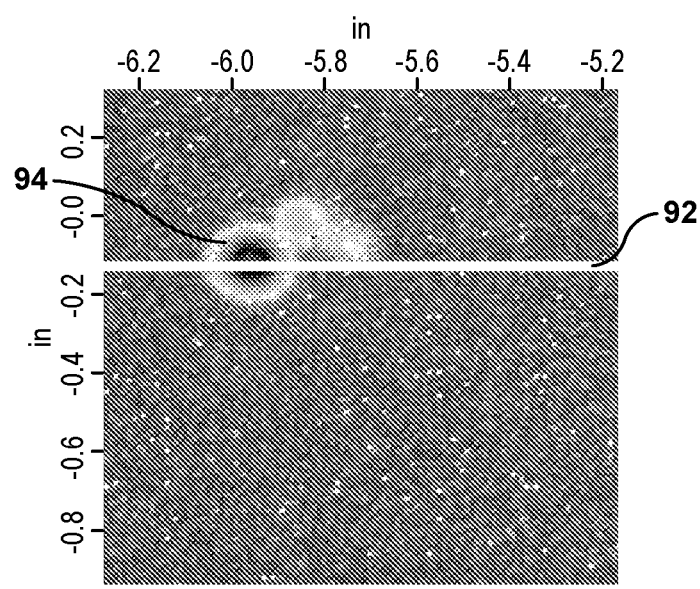
FIG. 7 is a diagram of a sample and an ultrasonic scan trajectory.

FIG. 7 illustrates an example of a trajectory 92 of an ultrasonic waveform through a sample. FIG. 7 also illustrates a reflector 94, through which the ultrasonic waveform propagates.

Figure 8:
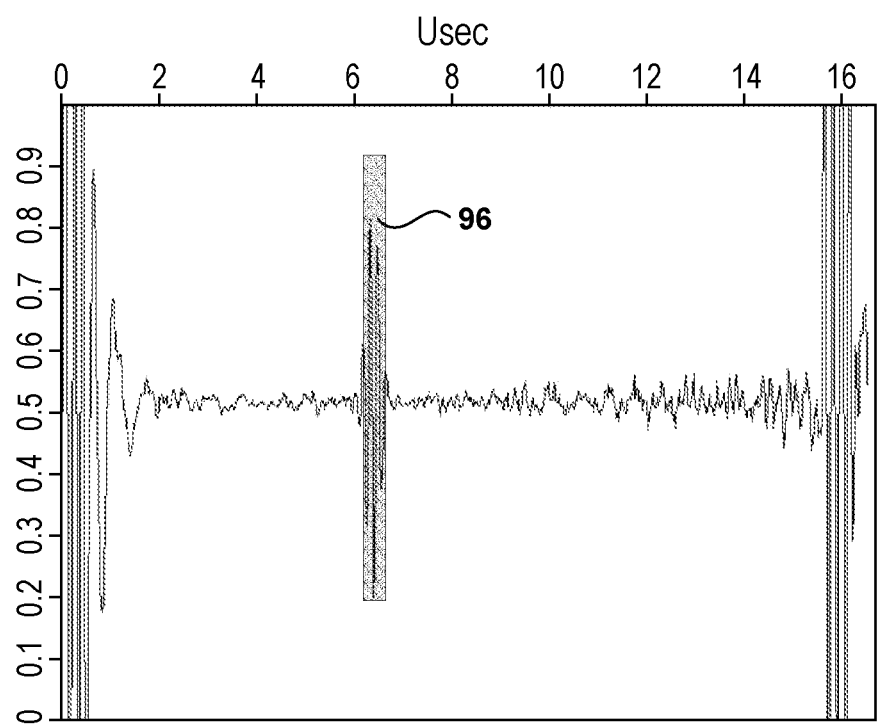
FIG. 8 is a diagram of ultrasonic waveform data sensed for the ultrasonic scan trajectory shown in FIG. 7.

FIG. 8 is a diagram of sensed amplitude as a function of time for the ultrasonic waveform shown in FIG. 7. The highlighted portion 96 indicates a portion of the sensed signal, comprising a time width of approximately 0.4 microseconds, which has been selected for application of an FFT.

Figure 9:
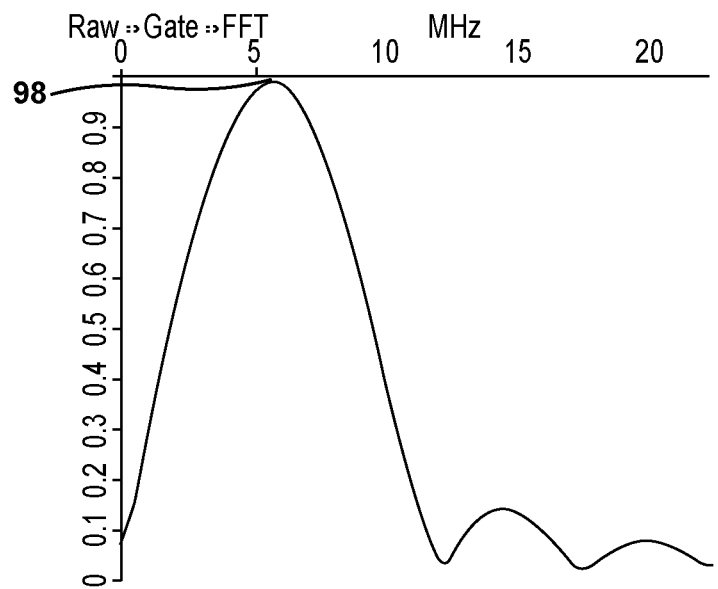
FIG. 9 is a diagram of a portion of the ultrasonic waveform data shown in FIG. 8 after being subjected to a Fast Fourier Transform (FFT).

FIG. 9 is a plot of amplitude versus frequency for the sensed ultrasonic waveform shown in FIG. 8, after application of the FFT. The plot in FIG. 9 shows that the dominant frequency 98 of the waveform is approximately 5.7 MHz.

FIG. 10 is a plot of dominant frequency versus position, in microseconds, for a plurality of portions proximate to reflector 94. Each portion comprises a time width of approximately 0.1 microseconds (the positions are spaced apart approximately 0.1 microseconds). Based on FIG. 10, a micro-texture zone size of the reflector is found to be approximately 0.5 microseconds (the width of the plateau having a dominant frequency of about 6.6 MHz).

Examples 2 and 3

Figure 11:
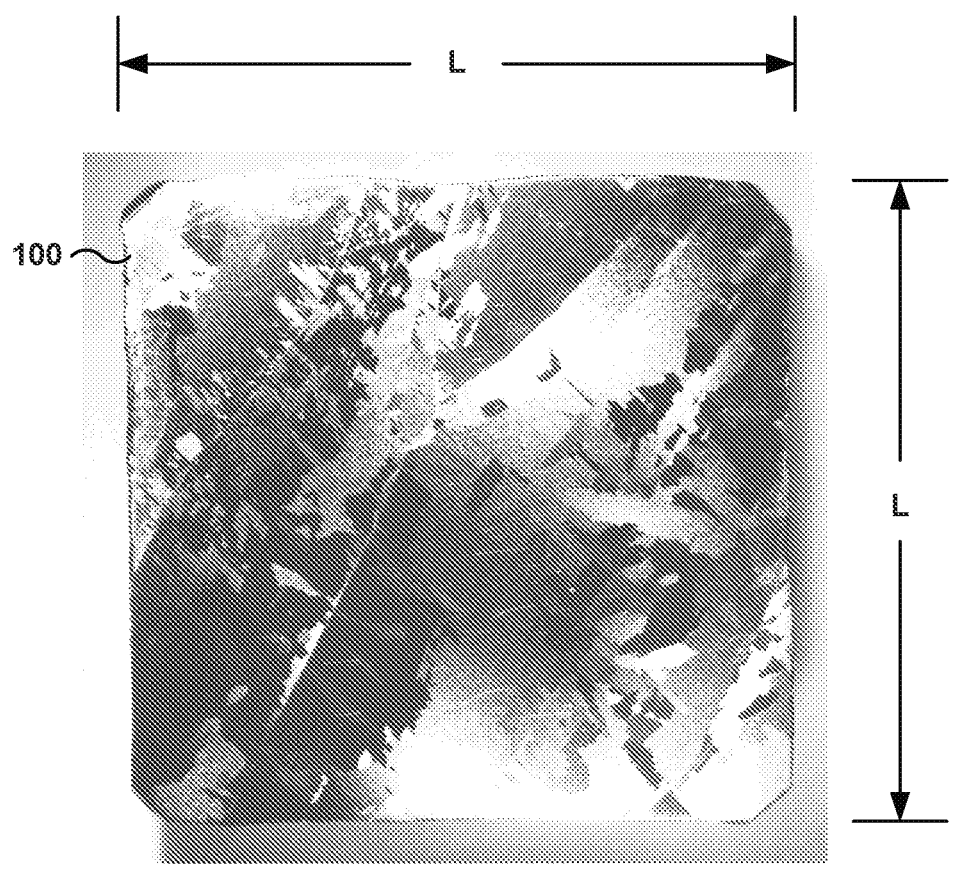
FIG. 11 in an example of an optical photograph of a polycrystalline Ti sample.

FIG. 11 in an example of an optical photograph of a polycrystalline Ti sample 100. Ti sample 100 is a rectangular prism having major sides with a length, L, of approximately one inch. Surfaces of Ti sample 100 oriented in planes substantially normal to the plane of the photograph have a length of approximately 0.5 inch. In other words, the dimensions of Ti sample 100 are approximately 1 inch by 1 inch by 0.5 inch. The upper surface of Ti sample 100 has been polished and etched to reveal individual grains of Ti sample 100, which are visible in the photograph as different shades of gray.

FIGS. 12 and 13 are examples of user interface screens from a computer implemented application for analyzing ultrasonic data collected from polycrystalline samples. FIG. 12 illustrates an example user interface screen showing an analysis of ultrasonic scans of Ti sample 100 collected with ultrasonic transducer 14 positioned contacting a surface of Ti sample 100 oriented substantially normal to the plane of the FIG. 11 (i.e., a side of Ti sample 100 that measures approximately 1 inch by 0.5 inches). Area 102 displays an A-scan for one ultrasonic measurement of Ti sample 100. An A-scan is a plot of sensed amplitude versus depth within Ti sample 100 for a single ultrasonic measurement (i.e., an ultrasonic measurement taken at a single position on a surface of Ti sample 100). Gate 1 indicates the width of a portion of the A-scan that has been selected and subjected to an FFT to determine the dominant (or center) frequency of the ultrasonic waveform for that portion.

Area 104 shows a Horizontal B-Scan, a representation of ultrasonic measurements taken along a plane within Ti sample 100. Similarly, area 106 shows a Vertical B-Scan, a representation of ultrasonic measurements taken along a plane within Ti sample 100. The plane represented by the Vertical B-Scan is substantially perpendicular to the plane represented by the Horizontal B-Scan.

Area 108 shows calculated center (or dominant) frequencies for a plurality of portions all located along a single plane within Ti sample 100. Different colors represent different frequencies, as indicated by the legend 110. Adjacent portions within Ti sample 100 having substantially similar colors (i.e., dominant frequencies) may be interpreted as being part of a single grain. In this way, the image shown in area 108 shows the crystallographic structure along a plane within Ti sample 100.

FIG. 13 illustrates a similar user interface screen as FIG. 12. However, the data shown in FIG. 13 is for a different plane within the Ti sample 100 sample shown in FIG. 11. Again, area 112 shows an A-Scan for an ultrasonic measurement taken at a position on a surface of Ti sample 100. Similarly, areas 114 and 116 show a Horizontal B-Scan and a Vertical B-Scan, respectively, for different planes within Ti sample 100. Again, the planes of the Horizontal B-Scan and the Vertical B-Scan are substantially normal to each other. Area 118, then, shows calculated center (or dominant) frequencies for a plurality of portions all located along a single plane within the Ti sample 100.

Comparative Example 1

Figure 14:
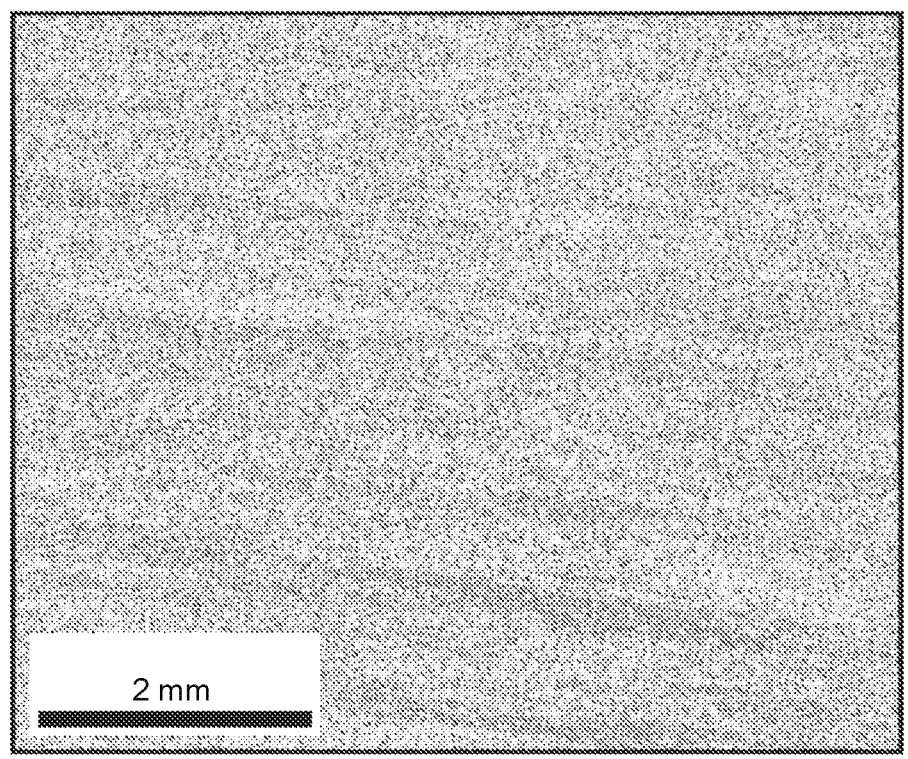
FIG. 14 is an example of electron backscatter diffraction (EBSD) data collected from a polycrystalline sample.

FIG. 14 illustrates an example of an electron backscatter diffraction (EBSD) scan collected from the surface of a sample exhibiting crystallographic microtexture. In this illustration the crystallographic microtexture manifests itself as localized regions of similar color. These colors represent the crystallographic orientation of the grains being examined using the electron beam.

Example 4

FIG. 15 illustrates an example of an ultrasonic crystallographic texture measurement at a plane within the same sample which had EBSD analysis performed, as illustrated in FIG. 14. FIG. 15 illustrates the determined dominant frequency for a plurality of portions of the sample along a single plane within the sample. The dominant frequency values are represented by color in FIG. 15. Accordingly, localized regions of similar color represent portions of the sample with similar dominant frequencies, i.e., with similar crystallographic orientation. As described herein, the dominant frequencies may be used to determine the crystallographic orientation.

Various embodiments have been described. These and other embodiments are within the scope of the following claims.

The invention claimed is:

1. A system comprising:
   an ultrasonic waveform generator configured to generate an ultrasonic waveform that propagates through a sample;
   an ultrasonic waveform detector configured to detect the reflected ultrasonic waveform that propagated through the sample; and
   a data analysis device configured to:
      receive from the ultrasonic waveform detector ultrasonic waveform data representative of the reflected ultrasonic waveform that propagated through the sample;
      select a portion of the ultrasonic waveform data;
      apply a Fast Fourier Transform to the portion of the ultrasonic waveform data to transform the portion from a time domain to a frequency domain;
      identify a dominant frequency of the portion in the frequency domain; and
      determine a characteristic of a crystallographic texture for the portion based on at least one equation that relates the dominant frequency of the portion to the characteristic of the crystallographic texture for the portion.

2. The system of claim 1,
   wherein the data analysis device is further configured to control the ultrasonic waveform generator to generate the ultrasonic waveform such that the ultrasonic waveform propagates through a first surface of the sample to a second surface of the sample, wherein at least a portion of the ultrasonic waveform reflects from the second surface of the sample to form the reflected ultrasonic waveform.

3. The system of claim 1, wherein the sample comprises at least one of a polycrystalline material, titanium, or a titanium alloy.

4. The system of claim 1, wherein the characteristic of the crystallographic texture comprises a crystallographic orientation value.

5. The system of claim 4, wherein the data analysis device is configured to:
   determine the crystallographic orientation value for the portion based on the dominant frequency of the portion by:
      determining a velocity, $v_{id}$, for the portion of the reflected ultrasonic waveform that propagated through the sample represented by the ultrasonic waveform data based on the dominant frequency, and
      determining the crystallographic orientation value, $f_{id}$, according to the equation:

$$v_{id} \approx \sqrt{\frac{C^0_{11}}{\rho} - \frac{2A_1}{7\rho}\left(f_{id} - \frac{1}{3}\right)},$$

wherein $\rho$, $C^o{}_{11}$, and $A_1$ are constants selected according to a composition of the sample.

6. The system of claim 1, wherein the characteristic of the crystallographic texture comprises a micro-texture zone size.

7. The system of claim 6, wherein the portion comprises a first portion, and wherein the data analysis device is further configured to:
 select a second portion of the ultrasonic waveform data;
 apply the Fast Fourier Transform to the second portion of the ultrasonic waveform data to transform the second portion from the time domain to the frequency domain;
 identify a dominant frequency of the second portion in the frequency domain;
 compare the dominant frequency of the first portion and a dominant frequency of the second portion; and
 determine the micro-texture zone size based on the comparison.

8. The system of claim 1, wherein the portion comprises a first portion, and wherein the data analysis device is further configured to:
 select a second portion of the ultrasonic waveform data;
 apply the Fast Fourier Transform to the second portion of the ultrasonic waveform data to transform the second portion from the time domain to the frequency domain;
 identify a dominant frequency of the second portion in the frequency domain; and
 determine a characteristic of a crystallographic texture for the second portion based on the dominant frequency of the second portion.

9. The system of claim 8, wherein the data analysis device is further configured to:
 output the characteristic of the crystallographic texture of the first portion and the characteristic of the crystallographic texture of the second portion.

10. The system of claim 9, further comprising a user interface display, wherein the data analysis device is configured to control the user interface display to display a three-dimensional representation of the characteristic of the crystallographic texture of the first portion and the characteristic of the crystallographic texture of the second portion with respect to the sample.

11. The system of claim 1, wherein the data analysis device is further configured to:
 output the characteristic of the crystallographic texture of the portion.

12. A method comprising:
 generating, via an ultrasonic waveform generator, an ultrasonic waveform that propagates through a sample;
 detecting, via an ultrasonic waveform generator, the reflected ultrasonic waveform that propagated through the sample; and
 using a data analysis device:
  receiving from the ultrasonic waveform detector ultrasonic waveform data representative of the reflected ultrasonic waveform that propagated through the sample;
  selecting a portion of the ultrasonic waveform data;
  applying a Fast Fourier Transform to the portion of the ultrasonic waveform data to transform the portion from a time domain to a frequency domain;
  identifying a dominant frequency of the portion in the frequency domain; and
  determining a characteristic of a crystallographic texture for the portion based on at least one equation that relates the dominant frequency of the portion to the characteristic of the crystallographic texture for the portion.

13. The method of claim 12, further comprising:
 controlling, via the data analysis device, the ultrasonic waveform generator to generate the ultrasonic waveform such that the ultrasonic waveform propagates through a first surface of the sample to a second surface of the sample, wherein at least a portion of the ultrasonic waveform reflects from the second surface of the sample to form the reflected ultrasonic waveform.

14. The method of claim 12, wherein determining the characteristic of the crystallographic texture comprises determining a crystallographic orientation value.

15. The method of claim 14, wherein determining the crystallographic orientation value comprises:
 determining a velocity, $v_{id}$, for the portion of the reflected ultrasonic waveform that propagated through the sample represented by the ultrasonic waveform data based on the dominant frequency, and
 determining the crystallographic orientation value, $f_{id}$, according to the equation:

$$v_{id} \approx \sqrt{\frac{C^0_{11}}{\rho} - \frac{2A_1}{7\rho}\left(f_{id} - \frac{1}{3}\right)},$$

wherein $\rho$, $C^o_{11}$, and $A_1$ are constants selected according to a composition of the sample.

16. The method of claim 12, wherein determining the characteristic of the crystallographic texture comprises determining a micro-texture zone size.

17. The method of claim 16, wherein the portion comprises a first portion, the method further comprising:
 selecting a second portion of the ultrasonic waveform data;
 applying the Fast Fourier Transform to the second portion of the ultrasonic waveform data to transform the second portion from the time domain to the frequency domain;
 identifying a dominant frequency of the second portion in the frequency domain; and
 determining the micro-texture zone size based on the dominant frequency of the first portion and the dominant frequency of the second portion.

18. The method of claim 12, wherein the portion comprises a first portion, the method further comprising:
 selecting a second portion of the ultrasonic waveform data;
 applying the Fast Fourier Transform to the second portion of the ultrasonic waveform data to transform the second portion from the time domain to the frequency domain;
 identifying a dominant frequency of the second portion in the frequency domain;
 comparing the dominant frequency of the first portion and a dominant frequency of the second portion; and
 determining a characteristic of a crystallographic texture for the second portion based on the comparison.

19. The method of claim 18, further comprising displaying, via a user interface display, a three-dimensional representation of the characteristic of the crystallographic texture of the first portion and the characteristic of the crystallographic texture of the second portion with respect to the sample.

20. A non-transitory computer readable storage medium comprising instructions that cause a programmable processor to:
 control an ultrasonic waveform generator to generate an ultrasonic waveform that propagates through a sample;
 control an ultrasonic waveform detector to detect the reflected ultrasonic waveform that propagated through the sample;

receive from the ultrasonic waveform detector ultrasonic waveform data representative of a reflected ultrasonic waveform that propagated through the sample;
select a portion of the ultrasonic waveform data;
apply a Fast Fourier Transform to the portion of the ultrasonic waveform data to transform the portion from a time domain to a frequency domain;
identify a dominant frequency of the portion in the frequency domain; and
determine a characteristic of a crystallographic texture for the portion based on at least one equation that relates the dominant frequency of the portion to the crystallographic texture for the portion.

* * * * *